(12) United States Patent
Ooba

(10) Patent No.: US 11,565,422 B2
(45) Date of Patent: Jan. 31, 2023

(54) CONTROLLER OF ROBOT APPARATUS FOR ADJUSTING POSITION OF MEMBER SUPPORTED BY ROBOT

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 380 days.

(21) Appl. No.: 16/932,809

(22) Filed: Jul. 19, 2020

(65) Prior Publication Data

US 2021/0086366 A1 Mar. 25, 2021

(30) Foreign Application Priority Data

Sep. 25, 2019 (JP) .............................. JP2019-174341

(51) Int. Cl.
*B25J 9/16* (2006.01)
*B25J 13/08* (2006.01)
(Continued)

(52) U.S. Cl.
CPC ........... *B25J 9/1697* (2013.01); *B25J 9/0093* (2013.01); *B25J 9/1607* (2013.01); *B25J 9/1687* (2013.01);
(Continued)

(58) Field of Classification Search
CPC ...... B25J 9/1697; B25J 9/0093; B25J 9/1687; B25J 13/08; G05B 19/4155; G05B 2219/40269; G06T 1/0014; G06T 7/70
See application file for complete search history.

(56) References Cited

U.S. PATENT DOCUMENTS

| 2013/0197696 A1* | 8/2013 | Nammoto et al. ..... B25J 9/1612 700/258 |
| 2014/0012416 A1* | 1/2014 | Negishi ................. B25J 9/1607 700/251 |

(Continued)

FOREIGN PATENT DOCUMENTS

| JP | 2011131300 A | 7/2011 |
| JP | 2013180380 A | 9/2013 |

(Continued)

OTHER PUBLICATIONS

Koichi Hashimoto, "Visual sense and Control", URL : http://www.k2.t.u-tokyo.ac.jp/~koichi/Lecture/Pattern/2001/vs1.pdf, retrieval date:Jul. 26, 2019, 33pp.

*Primary Examiner* — Kira Nguyen
(74) *Attorney, Agent, or Firm* — Hauptman Ham, LLP

(57) ABSTRACT

A controller of the robot apparatus performs approaching control for making a second workpiece approach a first workpiece and position adjustment control for adjusting a position of the second workpiece with respect to a position of the first workpiece. The approaching control includes control for calculating a movement direction and a movement amount of a position of the robot based on an image captured by a first camera, and making the second workpiece approach the first workpiece. The position adjustment control includes control for calculating a movement direction and a movement amount of a position of the robot based on an image captured by the first camera and an image captured by the second camera, and precisely adjusting a position of the first workpiece with respect to the second workpiece.

6 Claims, 14 Drawing Sheets

(51) Int. Cl.
*G06T 1/00* (2006.01)
*G05B 19/4155* (2006.01)
*G06T 7/70* (2017.01)
*B25J 9/00* (2006.01)

(52) U.S. Cl.
CPC .......... *B25J 13/08* (2013.01); *G05B 19/4155* (2013.01); *G06T 1/0014* (2013.01); *G06T 7/70* (2017.01); *G05B 2219/40269* (2013.01)

(56) References Cited

U.S. PATENT DOCUMENTS

| | | | | |
|---|---|---|---|---|
| 2015/0309762 | A1* | 10/2015 | Augustine | G06F 1/163 345/87 |
| 2018/0043539 | A1* | 2/2018 | Kamon | B25J 9/1065 |
| 2020/0298411 | A1* | 9/2020 | Feiten | B25J 9/1697 |
| 2021/0003993 | A1* | 1/2021 | Hashimoto | G05B 19/4155 |

FOREIGN PATENT DOCUMENTS

| | | | |
|---|---|---|---|
| JP | 2015214022 | A | 12/2015 |
| JP | 2017170599 | A | 9/2017 |
| JP | 2018083284 | A | 5/2018 |

\* cited by examiner

CONTROLLER OF ROBOT APPARATUS FOR ADJUSTING POSITION OF MEMBER SUPPORTED BY ROBOT

RELATED APPLICATIONS

The present application claims priority to Japanese Application Number 2019-174341, filed Sep. 25, 2019, the disclosure of which is hereby incorporated by reference herein in its entirety.

BACKGROUND OF THE INVENTION

1. Field of the Invention

The present invention relates to a controller of a robot apparatus that adjusts a position of a member that is supported by a robot.

2. Description of the Related Art

In a robot apparatus that is provided with a robot, a desired task can be performed by attaching an operation tool corresponding to the task to the robot. For example, by attaching a hand that grips a workpiece as an operation tool to the robot, the robot apparatus can convey the workpiece to a desired position.

In the related art, it is known that a position of a robot is controlled by using an image captured by a camera when a task in which one workpiece is attached to another workpiece is performed. Furthermore, it is known that a position of a robot is controlled by detecting force that is applied to the robot (for example, see Japanese Unexamined Patent Application Publication No. 2018-83284). When a position of a robot is adjusted based on an image captured by a camera, a goal image of a workpiece can be prepared in advance. In addition, control is known in which, by using a difference between an image of the current workpiece and the goal image, the position of the robot is adjusted (for example, see Japanese Unexamined Patent Application Publication No. 2015-214022 and Japanese Unexamined Patent Application Publication No. 2013-180380).

Control is known in which a vision sensor coordinate system is calibrated in advance with respect to a robot coordinate system and a three-dimensional position of a workpiece is calculated based on a position of the workpiece in the vision sensor coordinate system. Alternatively, a Jacobian matrix relevant to a position and a size of a characteristic portion in an image can be generated in advance. Control is known in which a position of a robot is corrected based on a position of a characteristic portion in an image captured by a camera, a position of the characteristic portion in target data, and a Jacobian matrix (for example, see Japanese Unexamined Patent Application Publication No. 2017-170599, and the document that is disclosed on the Internet "Visual sense and Control" (author: Hashimoto Koichi, URL: http://www.k2.t.u-tokyo.ac.jp/~koichi/Lecture/Pattern/2001/vs1.pdf, retrieval date on internet: Jul. 26, 2019).

Furthermore, when a robot apparatus grips a workpiece, a position of the workpiece in a hand may deviate. In this case, it is known that an image of the workpiece that is gripped by the hand is captured by a camera and a position and an orientation of the workpiece with respect to the robot is detected. In addition, control is known in which a position and an orientation of the hand is adjusted based on the position and the orientation of the workpiece (see, for example, Japanese Unexamined Patent Application Publication No. 2011-131300).

SUMMARY OF THE INVENTION

When a robot apparatus performs a task, control for positionally aligning a member that is supported by a robot with respect to another member may be performed. For example, by controlling a position and an orientation of the robot, a workpiece that is gripped by the robot apparatus can be attached to another workpiece or can be placed inside another workpiece.

In the case where the robot apparatus performs a task, when a position of the member that is supported by the robot cannot be controlled with high accuracy, there is a risk that the robot apparatus may fail the task. For this reason, it is preferable that the robot apparatus can perform control for precisely aligning a position. In particular, there is a problem that it is difficult to perform the control for precisely aligning a position of a member after the member is conveyed by changing a position and an orientation of the robot.

One aspect of the present disclosure is a controller of a robot apparatus that adjusts a relative position of a second member with respect to a first member by moving the second member by a robot. The controller includes a first vision sensor that captures an image of a first member, and a second vision sensor that captures an image of the first member and the second member from a direction different from that of the first vision sensor. The controller includes an arithmetic processing unit that generates a movement command for the robot, and an operation control unit that drives the robot based on the movement command. The controller is formed so as to perform approaching control for making the second member that is positioned away from the first member approach the first member and position adjustment control for adjusting a position of the second member with respect to a position of the first member after the second member approaches the first member. The approaching control includes control in which the arithmetic processing unit calculates a movement direction and a movement amount of a position of the robot based on an image captured by the first vision sensor and generates a first movement command for making the second member approach the first member. The approaching control includes control in which the operation control unit changes a position of the robot based on the first movement command. The position adjustment control includes control in which the arithmetic processing unit calculates a movement direction and a movement amount of a position of the robot based on an image captured by the first vision sensor and an image captured by the second vision sensor and generates a second movement command for adjusting a position of the first member with respect to the second member. The position adjustment control includes control in which the operation control unit changes a position of the robot based on the second movement command.

DETAILED DESCRIPTION

A controller of a robot apparatus according to the embodiment will be described with reference to FIG. 1 to FIG. 19. In the present embodiment, a robot apparatus that performs a task for assembling a product will be described as an example.

Figure 1:
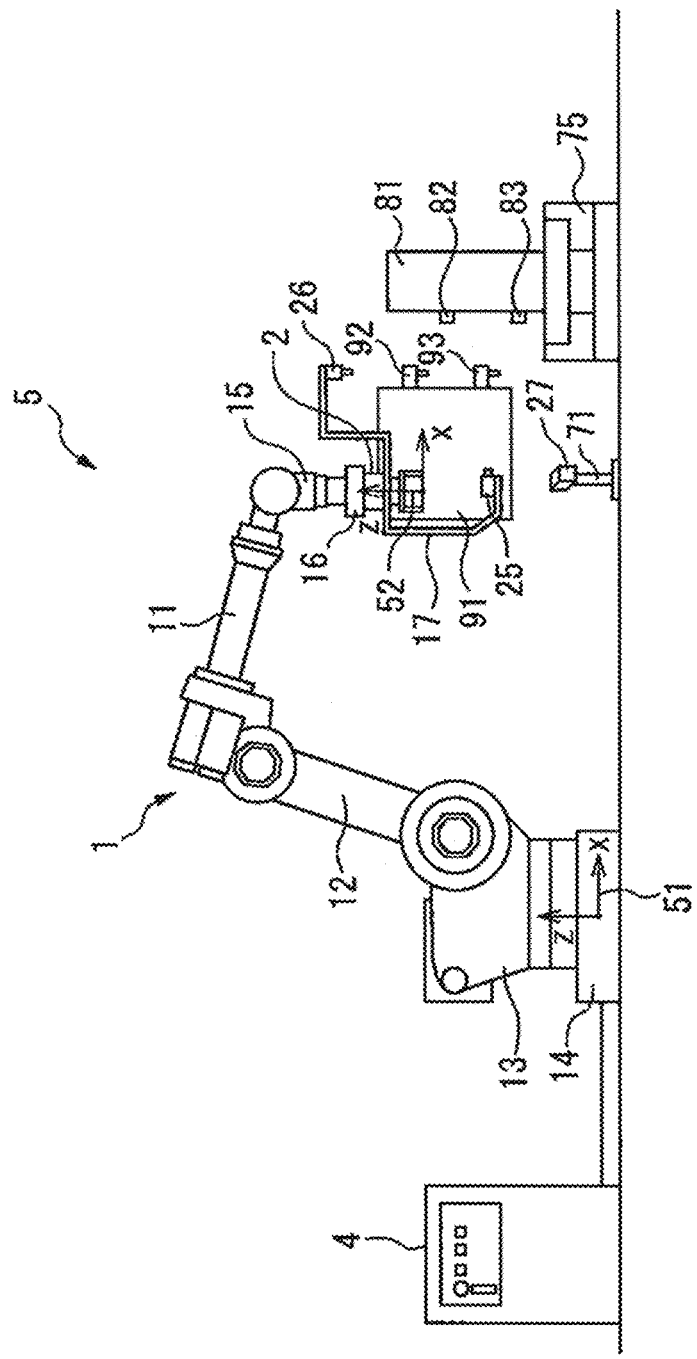
FIG. 1 is a schematic view of a robot apparatus according to an embodiment.
Figure 2:
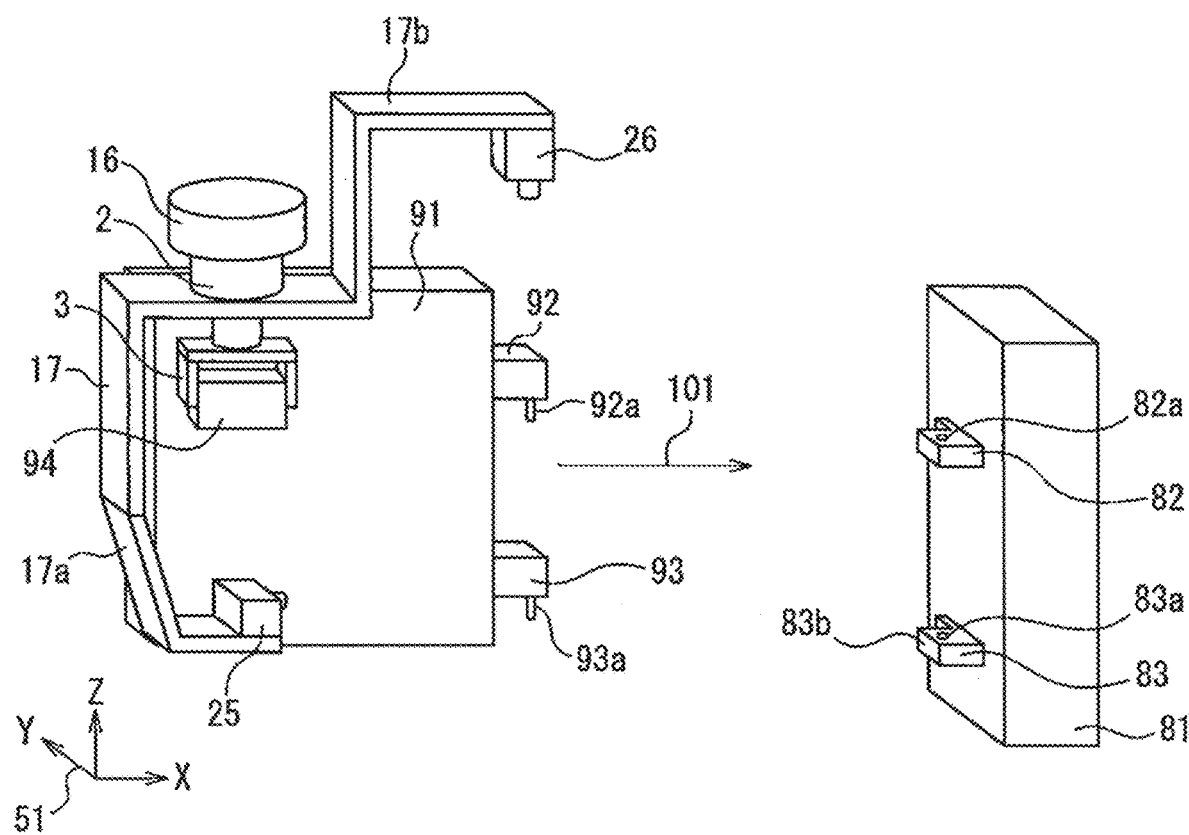
FIG. 2 is an enlarged perspective view of a first workpiece, a second workpiece, and a hand in the robot apparatus.

FIG. 1 is a schematic view of a robot apparatus in the present embodiment. FIG. 2 is an enlarged perspective view of a first workpiece, a second workpiece, and a hand in the robot apparatus. With reference to FIG. 1 and FIG. 2, a robot apparatus 5 includes a hand 2 as an operation tool (end effector) and a robot 1 that moves the hand 2. The robot apparatus 5 performs a task for attaching a second workpiece 91 as a second member to a first workpiece 81 as a first member.

The robot 1 is an articulated robot having a plurality of joints. The robot 1 includes a base part 14 and a turning base 13 that is supported by the base part 14. The base part 14 is fixed on an installation surface. The turning base 13 is formed so as to rotate relative to the base part 14. The robot 1 includes an upper arm 11 and a lower arm 12. The lower arm 12 is rotatably supported by the turning base 13 via the joint. The upper arm 11 is rotatably supported by the lower arm 12 via the joint. Additionally, the upper arm 11 rotates about a rotation axis parallel to an extending direction of the upper arm 11.

The robot 1 includes a wrist 15 that is coupled to an end portion of the upper arm 11. The wrist 15 is rotatably supported by the upper arm 11 via the joint. The wrist 15 includes a flange 16 that is formed so as to be rotatable. The hand 2 is fixed to the flange 16. The robot 1 of the present embodiment includes six drive axes, but the embodiment is not limited to this. Any robot that can move the operation tool can be employed.

The hand 2 is an operation tool that grips and releases the workpiece 91. The hand 2 has a plurality of claw parts 3. The hand 2 is formed such that the claw parts 3 are openable and closable. The workpiece 91 is gripped by pinching the workpiece 91 by the claw parts 3. The operation tool of the robot apparatus 5 is the hand 2 having the claw parts 3, but the embodiment is not limited to this. As the operation tool, any configuration that is formed so as to be able to grip a workpiece can be employed. For example, an operation tool that grips a workpiece by adsorption or suction by air pressure, an operation tool that can adjust positions of the claw parts of the hand by controlling a motor, or an operation tool that grips a workpiece by magnetic force may be employed.

The robot apparatus 5 according to the present embodiment includes a conveyor 75 as a transporting machine that conveys the first workpiece 81. The transporting machine is disposed around the robot 1. The conveyor 75 is formed so as to convey the workpiece 81 to a predetermined position. The conveyor 75 is formed so as to convey the workpiece 81 at a predetermined movement speed. In the example illustrated in FIG. 1, the workpiece 81 is conveyed in a direction perpendicular to a paper plane.

In the robot apparatus 5 of the present embodiment, the robot 1 attaches the workpiece 91 to the workpiece 81 while the conveyor 75 continues conveyance of the workpiece 81. That is, during a period when a task in which the workpiece 91 is attached is performed, the workpiece 81 is moved by the conveyor 75. The robot 1 attaches the workpiece 91 to the workpiece 81 while changing a position and an orientation of the workpiece 81 so as to follow the workpiece 81.

The second workpiece 91 has a grip part 94 that projects from a surface thereof. The second workpiece 91 is gripped by the hand 2 by gripping the grip part 94 by the claw parts 3. The first workpiece 81 has projection parts 82 and 83 that project from a surface thereof. The projection part 82 and the projection part 83 are disposed so as to be separated from each other. Holes 82a and 83a are formed on top surfaces of the projection parts 82 and 83, respectively. The second workpiece 91 has projection parts 92 and 93 that project from a surface of thereof. Pins 92a and 93a are fixed to the projection parts 92 and 93, respectively. The pin 92a and the pin 93a are arranged so as to be aligned in a straight line with each other. The robot apparatus 5 performs a task that inserts the pin 92a into the hole 82a and that inserts the pin 93a into the hole 83a after approaching the second workpiece 91 to the first workpiece 81 as indicated by an arrow 101.

The robot apparatus 5 includes a first camera 25 as the first vision sensor that captures an image of the first workpiece 81 and a second camera 26 as the second vision sensor that captures an image of the first workpiece 81 and the second workpiece 91. The second camera 26 captures an image from a direction different from that of the first camera 25. The cameras 25 and 26 of the present embodiment are two-dimensional cameras. The cameras 25 and 26 are supported by the hand 2 via a support member 17. The support member 17 has a bar-shaped part 17a that extends downward and a bar-shaped part 17b that extends upward. The first camera 25 is fixed to the bar-shaped part 17a that extends downward. The second camera 26 is fixed to the bar-shaped part 17b that extends upward.

Positions and orientations of the cameras 25 and 26 change together with the hand 2. The camera 25 captures an image of the first workpiece 81 during a period in which the second workpiece 91 approaches the first workpiece 81. That is, the camera 25 captures images from when the second workpiece 91 is away from the first workpiece 81 until when the second workpiece 91 is positioned near the first workpiece 81. Additionally, the camera 25 captures an image when the second workpiece 91 has been positioned near the first workpiece 81. The camera 25 according to the present embodiment is disposed such that an optical axis is substantially parallel to a direction in which the second workpiece 91 faces the first workpiece 81.

The camera 26 captures an image when the second workpiece 91 approaches the first workpiece 81. That is, the camera 26 captures an image when the second workpiece 91 is positioned near the first workpiece 81. The camera 26 according to the present embodiment is disposed such that an optical axis is substantially parallel to a vertical direction.

The robot apparatus 5 includes an auxiliary sensor for detecting an amount of gripping misalignment of the second workpiece 91 that is gripped by the hand 2. The auxiliary sensor according to the present embodiment is configured of a fixed camera 27 which is a vision sensor. The fixed camera 27 according to the present embodiment is a two-dimensional camera. The fixed camera 27 is fixed on the installation surface by a pedestal 71. The fixed camera 27 is disposed at a position where an image of the second workpiece 91 can be captured by changing a position and an orientation of the robot 1.

A reference coordinate system 51 is set in the robot apparatus 5. In the example illustrated in FIG. 1, an origin of the reference coordinate system 51 is set on the base part 14 of the robot 1. The reference coordinate system 51 is also referred to as a world coordinate system. The reference coordinate system 51 is a coordinate system in which a position of the origin is fixed, and further, directions of coordinate axes are fixed. Even when a position and an orientation of the robot 1 change, a position and a directions of the reference coordinate system 51 do not change. The reference coordinate system 51 has an X-axis, a Y-axis, and a Z-axis which are orthogonal to each other as the coordinate axes. Additionally, a W-axis is set as a coordinate axis around the X-axis. A P-axis is set as a coordinate axis around the Y-axis. An R-axis is set as a coordinate axis around the Z-axis.

A tool coordinate system 52 that moves together with the hand 2 is set in the robot apparatus 5. An origin of the tool coordinate system 52 according to the present embodiment is set at a tool tip point. The tool coordinate system 52 has an X-axis, a Y-axis, and a Z-axis which are orthogonal to each other as coordinate axes. Furthermore, the tool coordinate system 52 has a W-axis around the X-axis, a P-axis around the Y-axis, and an R-axis around the Z-axis. A position of the robot 1 can be represented by a position of the origin of the tool coordinate system 52. Furthermore, an orientation of the robot 1 is represented by directions of the tool coordinate system 52 with respect to the reference coordinate system 51.

Figure 3:
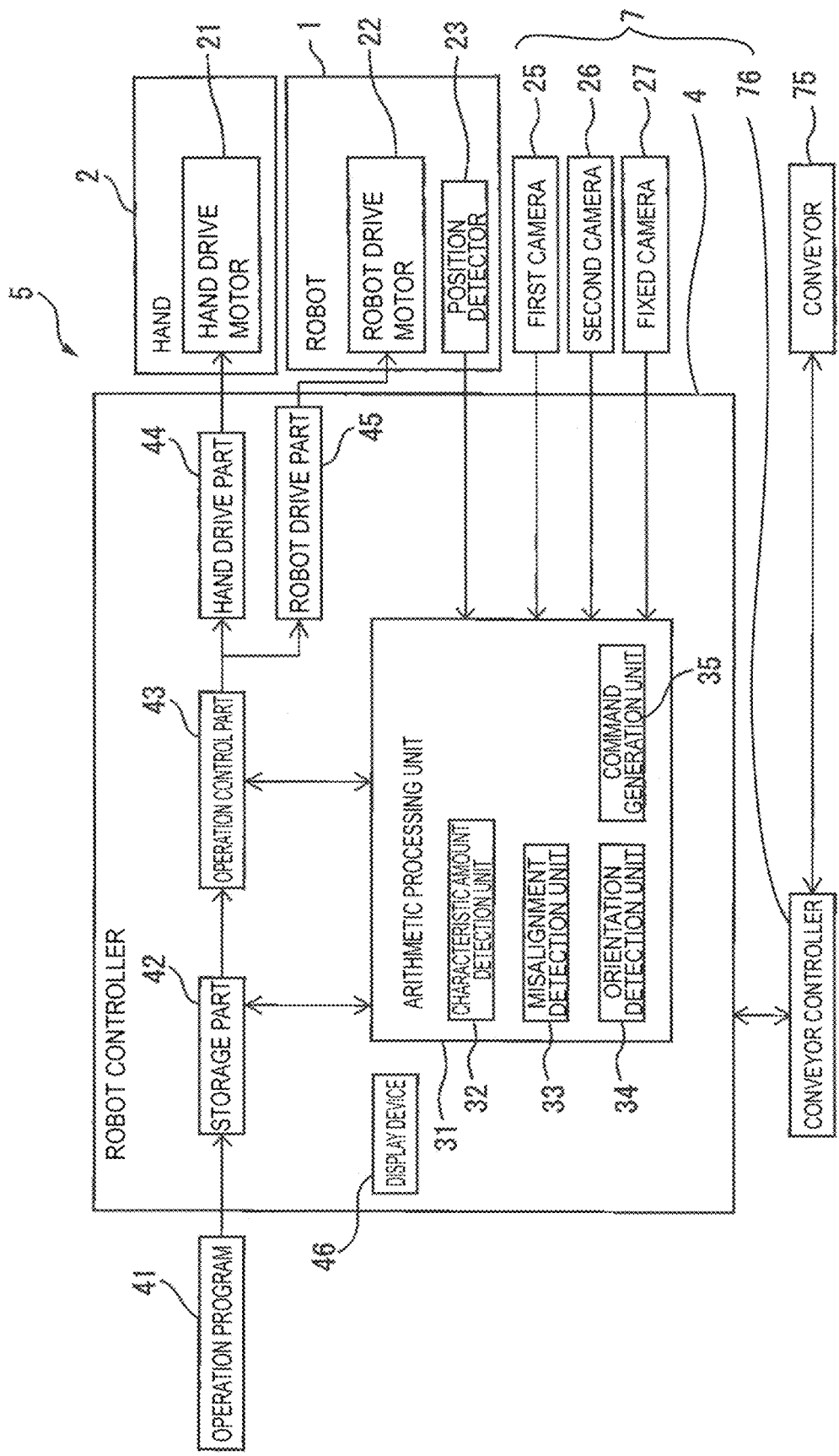
FIG. 3 is a block diagram of the robot apparatus.

FIG. 3 illustrates a block diagram of the robot apparatus according to the present embodiment. With reference to FIG. 1 to FIG. 3, the robot 1 includes a robot drive device that changes a position and an orientation of the robot 1. The robot drive device includes a plurality of robot drive motors 22 for driving constituent members such as an arm and a wrist. The driving of the robot drive motor 22 changes a direction of each constituent member.

The hand 2 includes a hand drive device that drives the hand 2. The hand drive device according to the present embodiment includes a hand drive motor 21 that drives the claw parts 3 of the hand 2. The claw parts 3 of the hand 2 are opened or closed by being driven by the hand drive motor 21. Note that the claw parts may be formed so as to operate by air pressure. In this case, the hand drive device can include a device that drives the claw parts by air pressure, such as an air pump and a cylinder.

The controller 7 of the robot apparatus 5 includes a robot controller 4 that controls the robot 1 and the hand 2. The robot controller 4 includes an arithmetic processing device (computer) including a central processing unit (CPU) as a processor. The arithmetic processing device includes a random access memory (RAM), a read-only memory (ROM), and the like that are coupled to the CPU via a bus. The robot controller 4 is input with an operation program 41 that has been created in advance in order to control the robot 1, the hand 2, and the conveyor 75. The robot 1 and the hand 2 convey the second workpiece 91 based on the operation program 41. The conveyor 75 conveys the first workpiece 81 based on the operation program 41.

The arithmetic processing device of the robot controller 4 includes a storage part 42 that stores predetermined information. The storage part 42 stores information relevant to the control of the robot 1, the hand 2, and the conveyor 75. The storage part 42 can be configured of a storage medium that can store information such as a volatile memory, a non-volatile memory, or a hard disk. The operation program 41 is stored in the storage part 42. The robot control device 4 includes a display device 46 that displays any information relevant to the robot apparatus 5. The display device 46 includes, for example, a liquid crystal display panel.

The arithmetic processing device of the robot controller 4 includes an operation control unit 43 that sends an operation command for the robot 1 and the hand 2. The operation control unit 43 corresponds to the processor that is driven in accordance with the operation program 41. The operation control unit 43 is formed so as to be able to read the information that is stored in the storage part 42. The processor reads the operation program 41 and functions as the operation control unit 43 by performing the control that is defined in the operation program 41.

The operation control unit 43 sends an operation command for driving the robot 1 to a robot drive part 45 based on the operation program 41. The robot drive part 45 includes an electric circuit that drives the robot drive motor 22. The robot drive part 45 supplies electricity to the robot drive motor 22 based on the operation command. In addition, the operation control unit 43 sends an operation command for driving the hand 2 to a hand drive part 44 based on the operation program 41. The hand drive part 44 includes an electric circuit that drives the hand drive motor 21. The hand drive part 44 supplies electricity to the hand drive motor 21 based on the operation command. Further, the operation control unit 43 sends a command for capturing an image to the cameras 25 and 26, and the fixed camera 27 based on the operation program 41.

The arithmetic processing device of the robot controller 4 includes an arithmetic processing unit 31 that processes outputs of the camera 25 and the fixed camera 27. The arithmetic processing unit 31 includes a characteristic amount detection unit 32 that detects a characteristic amount relevant to a position of a characteristic portion that is a predetermined distinctive part in images captured by the cameras 25 and 26 and the fixed camera 27. The arithmetic processing unit 31 includes a misalignment detection unit 33 that detects an amount of positional misalignment of gripping of the second workpiece 91 in the hand 2 based on the output of the fixed camera 27. The arithmetic processing unit 31 includes an orientation detection unit 34 that detects an amount of orientation deviation of the first workpiece 81 based on an image captured by at least one camera of the first camera 25 and the second camera 26. Further, the arithmetic processing unit 31 includes a command generation unit 35 that generates a movement command for allowing the robot 1 to operate.

The arithmetic processing unit 31 corresponds to the processor that is driven in accordance with the operation program 41. In particular, each unit of the characteristic amount detection unit 32, the misalignment detection unit 33, the orientation detection unit 34, and the command generation unit 35 corresponds to the processor that is driven in accordance with the operation program 41. The processor functions as each unit by reading the operation program 41 and performing control that is defined in the operation program 41.

The robot apparatus 5 includes a state detector for detecting an operating state of the robot apparatus 5. The state detector according to the present embodiment includes a position detector 23 that detects a position and an orientation of the robot 1. The position detector 23 is attached to the robot drive motor 22 corresponding to a drive axis of a constituent element such as an arm. For example, the position detector 23 detects a rotation angle when the robot drive motor 22 is driven. Based on the output from the position detector 23, a position and an orientation of the robot 1 are detected.

The controller 7 of the robot apparatus 5 includes a conveyor controller 76 that controls the operation of the conveyor 75. The conveyor controller 76 includes an arithmetic processing device (computer) that includes a CPU, a RAM, and the like. The conveyor controller 76 is formed so as to be able to mutually communicate with the robot controller 4. The operation controller 43 sends an operation command for driving the conveyor 75 to the conveyor controller 76 based on the operation program 41. The conveyor controller 76 receives the operation command from the robot controller 4 and drives the conveyor 75.

The controller 7 of the robot apparatus 5 according to the present embodiment includes the robot controller 4 that controls the robot 1 and the hand 2, and the conveyor controller 76 that controls the conveyor 75, but the embodiment is not limited to this. The robot apparatus 5 may be formed such that one controller controls the robot 1, the hand 2, and the conveyor 75.

Further, in the controller 7 of the robot apparatus 5 according to the present embodiment, the robot controller 4 includes the arithmetic processing unit 31 that has a function of processing the outputs of the cameras 25 and 26 and the fixed camera 27, but the embodiment is not limited to this. The controller of the robot apparatus may be provided with an arithmetic processing device (computer) that functions as the arithmetic processing unit 31, separately from the robot controller. The processor of the arithmetic processing device functions as the characteristic amount detection unit, the misalignment detection unit, the orientation detection unit, and the command generation unit by being driven based on the operating program. The arithmetic processing device that functions as the arithmetic processing unit 31 can be formed so as to be able to mutually communicate with the robot controller.

The controller 7 of the robot apparatus 5 according to the present embodiment performs gripping control for gripping the second workpiece 91. The controller 7 of the robot apparatus 5 performs approaching control for making the second workpiece 91 that is positioned away from the first workpiece 81 approach the first workpiece 81. The controller 7 of the robot apparatus 5 performs misalignment detection control for detecting an amount of positional misalignment of gripping of the second workpiece 91 with respect to the hand 2, and misalignment correction control for correcting the position of the robot 1 so as to cancel out the amount of the gripping misalignment based on the amount of the gripping misalignment.

The controller 7 of the robot apparatus 5 performs orientation detection control for detecting an amount of orientation deviation of the first workpiece 81, and orientation correction control for correcting the orientation of the robot 1 such that an orientation of the second workpiece 91 with respect to the first workpiece 81 becomes a predetermined orientation based on the amount of the orientation deviation detected by the orientation detection control. Then, after the second workpiece 91 approaches the first workpiece 81, the controller 7 of the robot apparatus 5 performs position adjustment control for adjusting a position of the second workpiece 91 with respect to the first workpiece 81 more precisely than the approaching control. Furthermore, the controller 7 of the robot apparatus 5 performs attachment control for inserting the pins 92a and 93a of the second workpiece into the holes 82a and 83a of the first workpiece 81.

Figure 4:
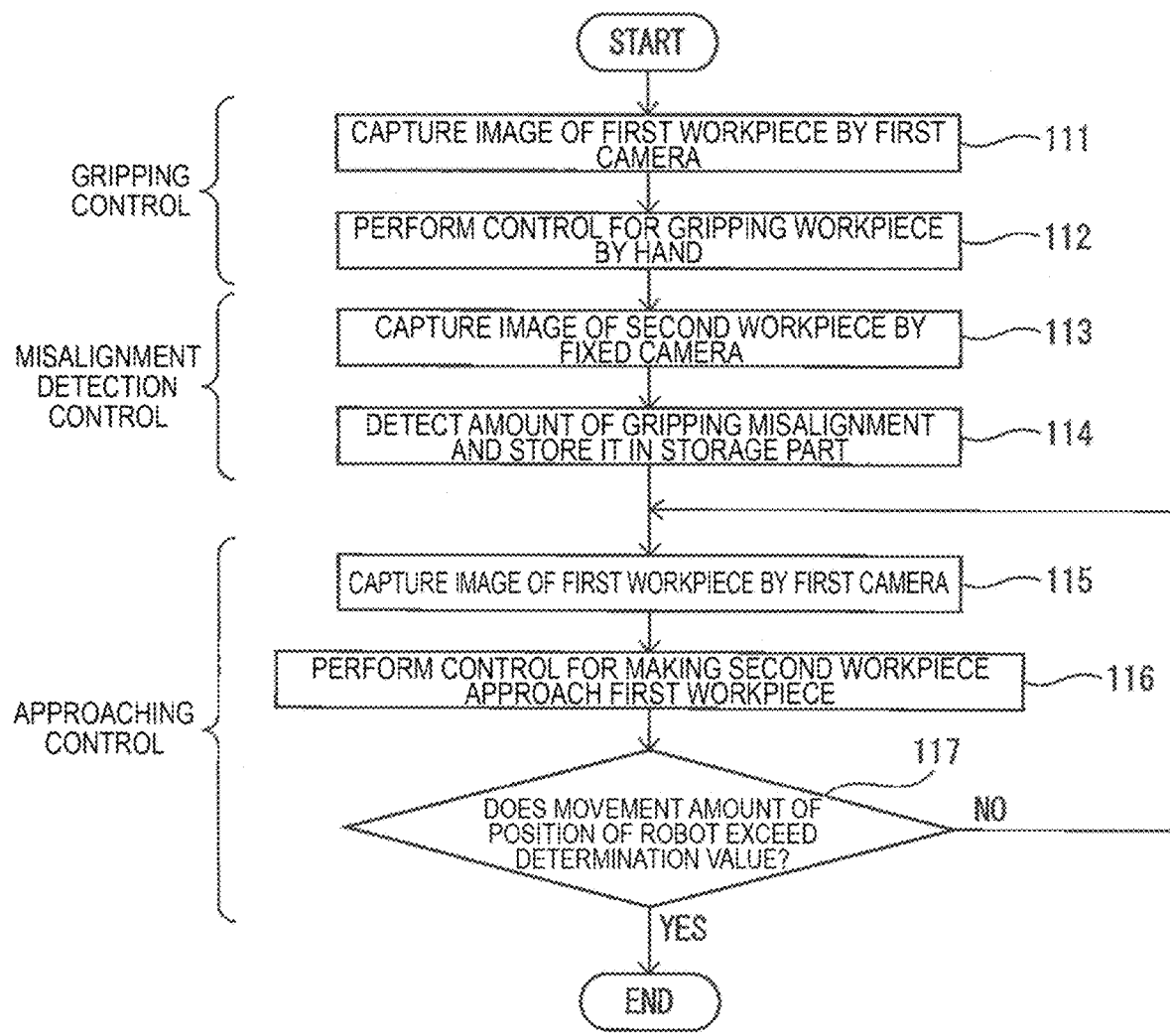
FIG. 4 is a flowchart of gripping control, misalignment detection control, and approaching control according to the embodiment.

FIG. 4 illustrates a flowchart of the gripping control, the misalignment detection control, and the approaching control in the present embodiment. First, in step 111 and step 112, the robot apparatus 5 performs the gripping control for gripping the second workpiece 91. For example, the robot apparatus 5 grips the second workpiece 91 that is placed on a workbench.

Figure 5:
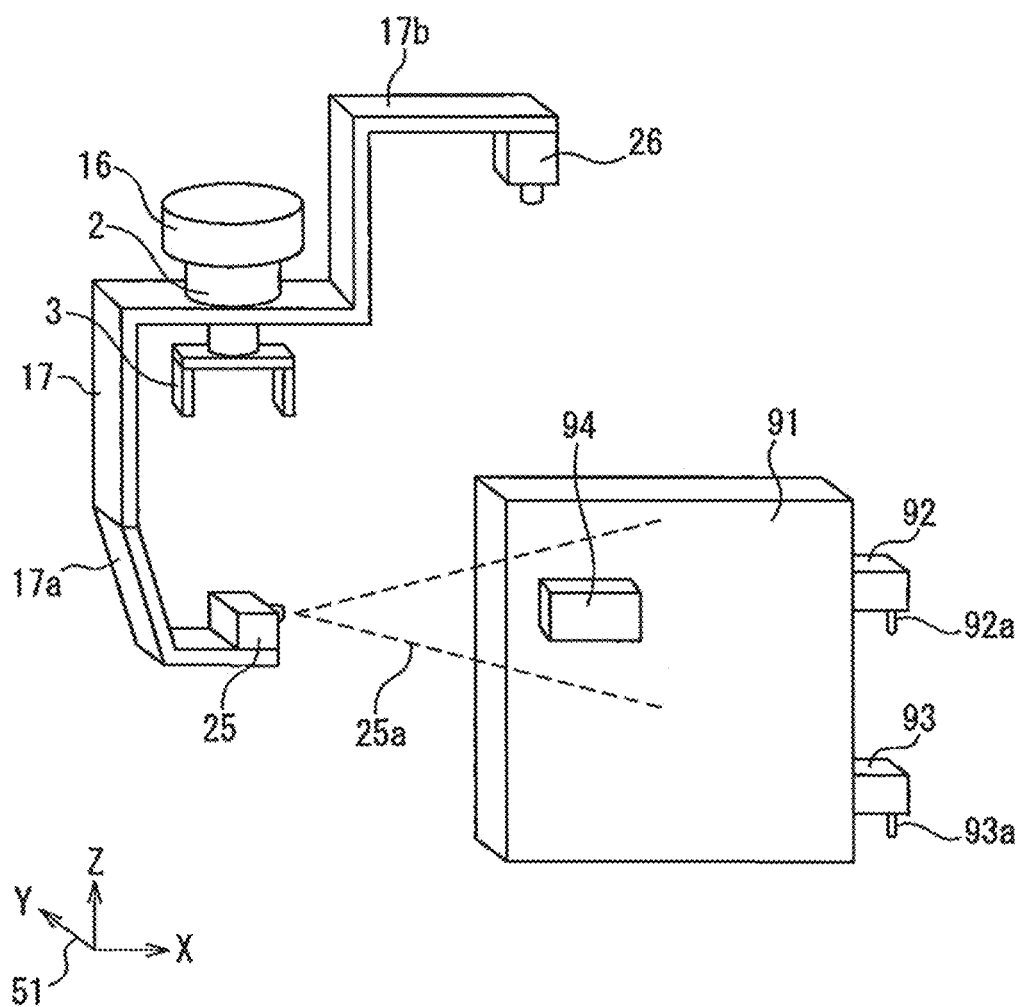
FIG. 5 is an enlarged perspective view of the hand and the second workpiece when the gripping control is performed.

FIG. 5 illustrates a perspective view of the second workpiece and the hand when the gripping control is performed. With reference to FIG. 4 and FIG. 5, in step 111, the camera 25 captures an image of the second workpiece 91. In the example herein, the grip part 94 of the workpiece 91 is set as a characteristic portion in order to grip the workpiece 91. A position and an orientation of the robot 1 where the camera 25 captures an image of the grip part 94 is predetermined. The operation control unit 43 changes the position and the orientation of the robot 1 and captures of an image of the grip part 94 by using the camera 25.

In step 112, the characteristic amount detection unit 32 of the arithmetic processing unit 31 detects the grip part 94 in the image captured by the camera 25. A base image of the grip part 94 when the grip part has been captured from a predetermined direction has been created in advance. By using the image captured by the camera 25 and the base image, the grip part 94 in the image captured by the camera 25 is detected by a template matching method. In the present embodiment, a screen coordinate system is set in images captured by the cameras 25 and 26. The characteristic amount detection unit 32 detects a position of the grip part 94 in the screen coordinate system.

A position of the workpiece 91 in the screen coordinate system with respect to an actual position of the workpiece in the tool coordinate system 52 has been calibrated. Therefore, the characteristic amount detection unit 32 can calculate a position of the grip part 94 in the tool coordinate system 52 based on the image captured by the camera 25. The command generation unit 35 generates a movement command for changing a position and an orientation of the robot 1 based on the position of the grip part 94. The robot 1 changes the position and the orientation thereof and grips the grip part by the hand 2.

Note that the gripping control for gripping a workpiece can be performed by any control. For example, a Jacobian matrix and a reference image relevant to a position of a characteristic portion in an image can be generated in advance. The Jacobian matrix can be calculated based on positional misalignment in the vision sensor coordinate system when a position of the robot is slightly moved. The position of the robot may be changed based on the position of the characteristic portion in an image captured by a camera, the position of the characteristic portion in the reference image, and the Jacobian matrix.

Next, when the robot apparatus 5 grips the workpiece 91, gripping misalignment may occur. Then, in step 113 and step 114, the misalignment detection control for detecting an amount of positional misalignment of gripping of the second workpiece 91 with respect to the hand 2 is performed.

Figure 6:
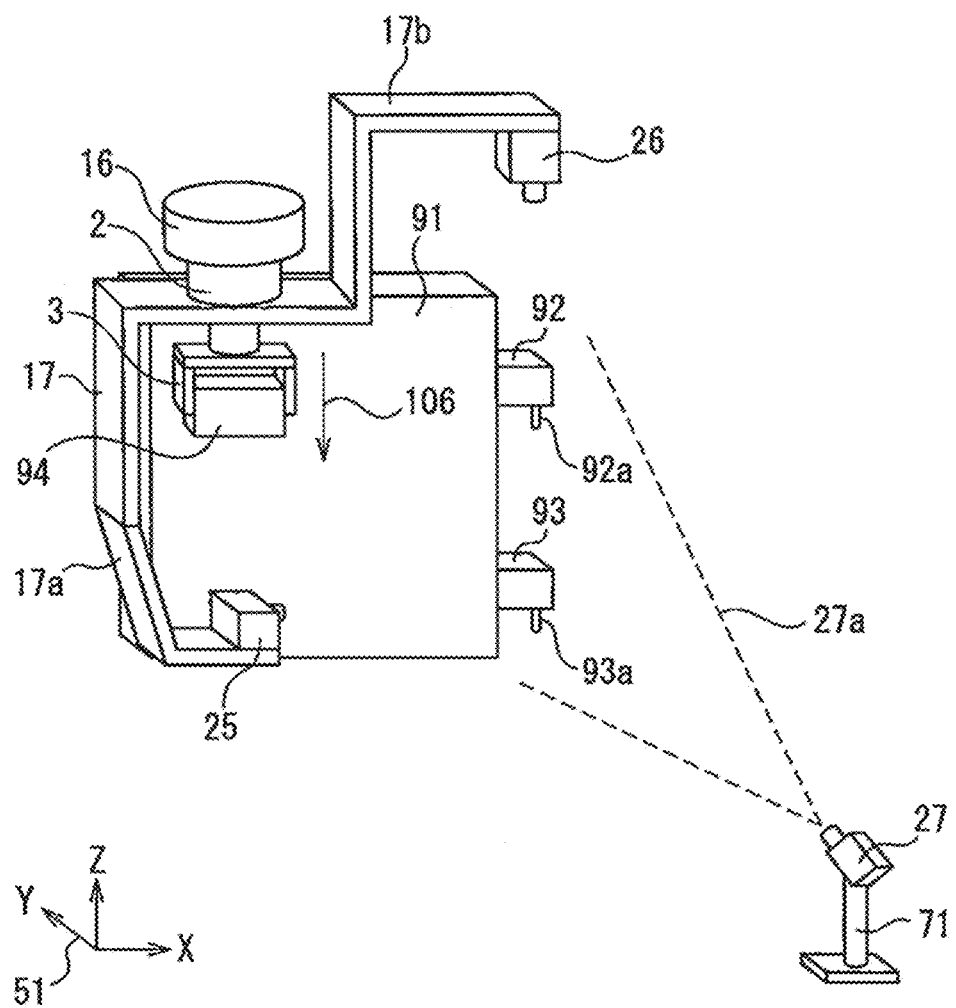
FIG. 6 is an enlarged perspective view of the first workpiece, the hand, and a fixed camera when the misalignment detection control is performed.

FIG. 6 illustrates a perspective view of the second workpiece, the hand, and the fixed camera when the misalignment detection control is performed. In the example illustrated in FIG. 6, the second workpiece 91 is misaligned downward with respect to the claw parts 3 of the hand 2, as indicated by an arrow 106. Due to this, in the present embodiment, control for correcting the gripping misalignment of the second workpiece 91 is performed.

With reference to FIG. 4 and FIG. 6, in step 113, an image of the second workpiece 91 is captured by the fixed camera 27. In the present example, the pins 92a and 93a of the workpiece 91 are set as characteristic portions in order to detect an amount of gripping misalignment of the workpiece 91. The operation control unit 43 changes the position and the orientation of the robot 1 such that the position and the orientation of the robot 1 becomes a position and an orientation that are set by the operation program 41 in order to capture an image of the workpiece 91. By changing the position and the orientation of the robot 1, the pins 92a and 93a of the workpiece 91 are positioned within an image-capturing range 27a of the fixed camera 27. Next, the fixed camera 27 captures an image of the pins 92a, 93a of the workpiece 91.

In step 114, the characteristic amount detection unit 32 of the arithmetic processing unit 31 detects the pins 92a and 93a in the image captured by the fixed camera 27. A base image of the pins 92a and 93a when they have been captured from a predetermined direction has been created in advance. By using the image captured by the fixed camera 27 and the base image, the pins 92a and 93a in the image captured by the fixed camera 27 are detected by the template matching method. Next, the characteristic amount detection unit 32 detects positions of the pins 92a and 93a in the screen coordinate system. The positions of the pins 92a and 93a correspond to a position of the workpiece 91.

The position of the workpiece 91 in the screen coordinate system 53 with respect to an actual position of the workpiece 91 in the tool coordinate system 52 has been calibrated. Accordingly, the misalignment detection unit 33 can calculate the positions of the pins 92a and 93a in the tool coordinate system 52 based on the image captured by the fixed camera 27. In other words, the misalignment detection unit 33 can calculate the position of the workpiece 91 in the tool coordinate system 52.

The misalignment detection unit 33 calculates the amount of gripping misalignment of the second workpiece 91 in the hand 2. A reference position of the workpiece 91 in the tool coordinate system 52 when the gripping misalignment of the workpiece 91 does not occur is predetermined. Based on this reference position and the position of the workpiece 91 that is detected from the image captured by the fixed camera 27, the amount of positional misalignment of the workpiece 91 in the hand 2 can be calculated in the tool coordinate system 52. The storage part 42 stores the amount of positional misalignment of the workpiece 91 in the hand 2. The positional misalignment of the workpiece 91 in the hand 2 is corrected by subsequent control.

Note that the misalignment detection control for detecting the amount of positional misalignment of the workpiece 91 in the hand 2 is not limited to the above-described configuration, and can be performed by any control. For example, by using the reference image that has been created in advance and the Jacobian matrix, the amount of positional misalignment of the workpiece 91 in the hand 2 may be detected.

Next, in step 115 to step 117, the approaching control for making the second workpiece 91 approach the first workpiece 81 is performed. In the present embodiment, a constant speed is adopted as movement speed of the workpiece 91 in a direction in which the second workpiece 91 approaches the first workpiece 81. In the example illustrated in FIG. 1, a constant speed is adopted as a speed at which the position of the robot 1 moves in the X-axis direction of the reference coordinate system 51. In the approaching control, a position of the workpiece 91 in the Y-axis direction and the Z-axis direction of the reference coordinate system 51 is adjusted.

Figure 7:
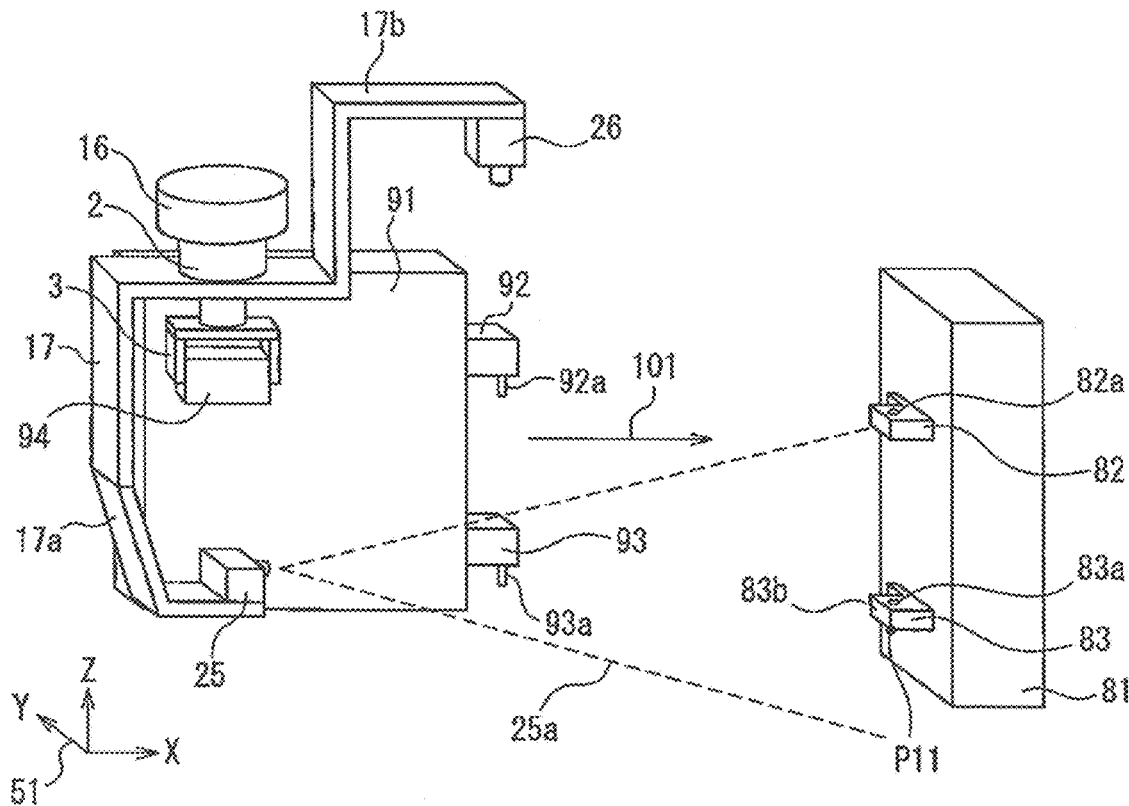
FIG. 7 is an enlarged perspective view of the first workpiece, the second workpiece, and the hand when the approaching control is performed.

FIG. 7 illustrates an enlarged perspective view of portions of the first workpiece, the second workpiece, and the hand when the approaching control is performed. In the approaching control, control for making the projection parts 92 and 93 of the second workpiece 91 approach the projection parts 82 and 83 of the first workpiece 81 is performed, as indicated by the arrow 101. The robot 1 changes the position and the orientation thereof such that the projection part 83 is positioned inside an image-capturing range 25a of the camera 25 based on the operation program 41.

An operator generates a reference image of the first workpiece 81 as a preparation task for performing the approaching control. The reference image is an image captured by the camera 25 when the second workpiece 91 is positioned at a target position with respect to the first workpiece 81. In addition, the reference image is an image based on a state in which the second workpiece 91 is gripped at a predetermined position with respect to the hand 2. In other words, the reference image is an image based on a state in which there is no gripping misalignment of the second workpiece 91. The reference image can be created by the operator in advance and can be stored in the storage part 42.

The reference image according to the present embodiment uses an image actually captured by the camera, but the embodiment is not limited to this. As the reference image, for example, by a computer aided design (CAD) device or the like, three-dimensional data of the robot apparatus 5 and the workpieces 81 and 91 can be generated. The three-dimensional data can be generated when the workpiece 91 is positioned at the target position with respect to the workpiece 81. The reference image may be generated by projecting the three-dimensional data onto one plane along a direction corresponding to a direction of the camera.

In the present embodiment, a characteristic portion for detecting a position of the first workpiece 81 is predetermined. The characteristic portion is a portion where a shape can be detected when an image is analyzed. As the characteristic portion, a part of the workpiece, a pattern that is formed on a surface of the workpiece, a line or a drawing that is drawn on the surface of the workpiece, and the like can be adopted. In the approaching control, a side surface 83b of the projection part 83 is defined as the characteristic portion.

For the first workpiece 81, a set point P11 is set on the side surface 83b of the projection part 83 as the characteristic portion. The set point P11 is set at a corner of the side surface 83b of the projection part 83. A position of the set point P11 corresponds to the position of the workpiece 81. The set point P11 is set at a position that is included in an image captured by the camera 25.

With reference to FIG. 4 and FIG. 7, in step 115, the first camera 25 captures an image of the side surface 83b of the projection part 83 which is the characteristic portion of the first workpiece 81. Next, in step 116, control for changing the position of the robot 1 such that the second workpiece 91 approaches the first workpiece 81 based on the image captured by the first camera 25 is performed.

Figure 8:
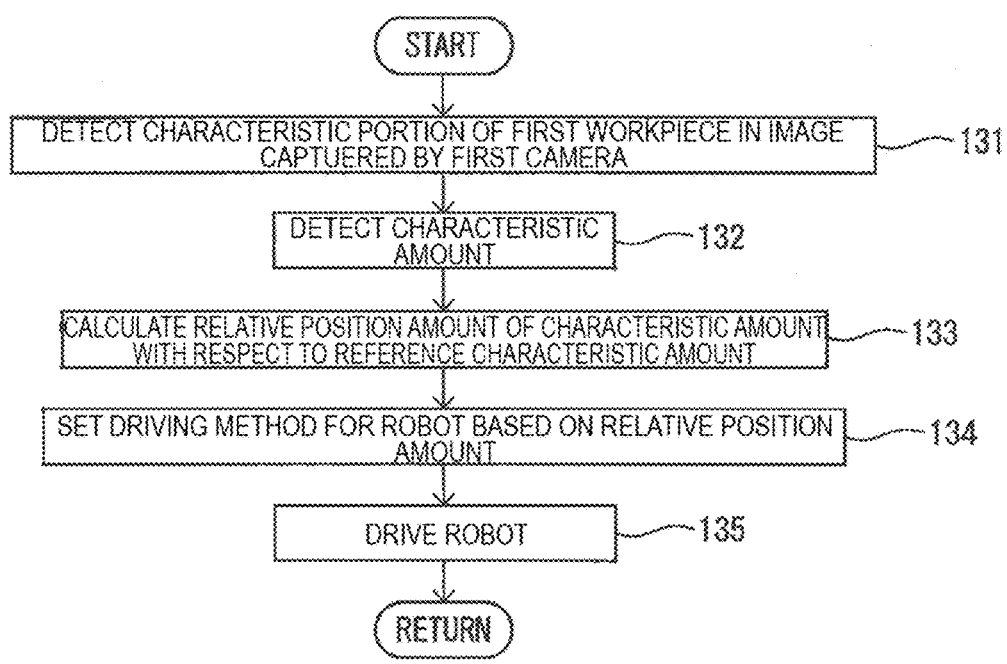
FIG. 8 is a flowchart of control that is included in the approaching control.
Figure 9:
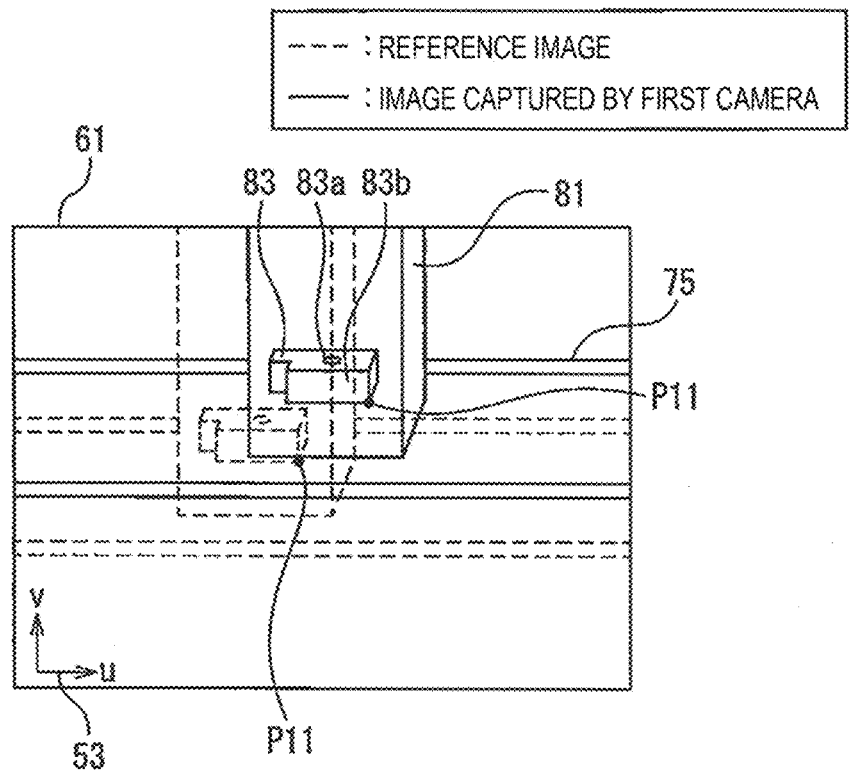
FIG. 9 is an image captured by a first camera when the approaching control is being performed.

FIG. 8 illustrates a flowchart of control for making the second workpiece approach the first workpiece. The control in FIG. 8 corresponds to the control in step 116 in FIG. 4. FIG. 9 illustrates an image captured by the first camera in the approaching control. FIG. 9 illustrates an image 61 captured by the camera 25 by using solid lines. For purpose of reference, a reference image is also illustrated by dashed lines. The image 61 captured by the camera 25 is misaligned from the reference image. In the approaching control, the position of the robot 1 is changed such that the image captured by the camera 25 matches the reference image.

With reference to FIG. 7 to FIG. 9, in step 131, the characteristic amount detection unit 32 of the arithmetic processing unit 31 detects the characteristic portion in the image 61 captured by the camera 25. As a method for detecting the characteristic portion, a base image serving as a reference of the workpiece 81 can be prepared in advance. Alternatively, the reference image may be used as the base image. By using the base image and an image captured by the camera 25, the characteristic portion can be detected in the image captured by the camera 25 by a method such as template matching. In the present example, the side surface 83b of the projection part 83 is detected. Note that an orientation of the first workpiece 81 may be inclined with respect to a desired orientation. When the orientation deviation of the first workpiece 81 is large, a plurality of reference images in which the first workpiece 81 is inclined at each of predetermined angles may be created in advance.

In step 132, the characteristic amount detection unit 32 detects a characteristic amount relevant to a position of the characteristic position. In the present embodiment, the screen coordinate system 53 is set in the image 61 captured by the camera 25. The screen coordinate system 53 is a coordinate system when any point in an image is set as an origin. The screen coordinate system 53 has a u-axis and a v-axis that are orthogonal to each other. The screen coordinate system 53 corresponds to the vision sensor coordinate system of the camera 25.

The characteristic amount relevant to a position according to the present embodiment is a coordinate value of the u-axis and a coordinate value of the v-axis in the screen coordinate system 53 in an image. The characteristic amount detection unit 32 detects a position of the set point P11 that has been set as the characteristic portion based on the characteristic portion detected in the image 61 captured by the camera 25.

In other words, the characteristic amount detection unit 32 detects coordinate values (u1m, v1m) of the set point P11 in the screen coordinate system 53 as the characteristic amount relevant to the position of the characteristic portion.

In step 133, the command generation unit 35 calculates a relative position amount which is a relative positional difference between a position of the set point P11 in the image 61 captured by the camera 25 and a position of the set point P11 in the reference image. As a first reference characteristic amount in the reference image, coordinate values (u1b, v1b) of the set point P11 in the screen coordinate system 53 are predetermined.

The command generation unit 35 calculates, for each coordinate axis, the relative position amount that is obtained by subtracting coordinate values of the set point P11 in the reference image from coordinate values of the set point P11 in the image captured by the camera 25. The relative position amount can be expressed as values relevant to the u-axis and the v-axis [(u1m−u1b), (v1m−v1b)], respectively. In this way, in the present embodiment, a relative position amount relevant to the u-axis and a relative position amount relevant to the v-axis are calculated.

In step 134, the command generation unit 35 sets a driving method for the robot 1 based on the relative position amount. The command generation unit 35 generates the first movement command that includes a movement direction and a movement amount of the position of the robot 1 in the reference coordinate system 51. In the present embodiment, a movement direction of a position of the robot with respect to a relative position amount is predetermined. A movement direction of a position of the robot 1 with respect to a positive value or a negative value of the u-axis in the screen coordinate system 53 is defined in the reference coordinate system 51.

Furthermore, a method for calculating a movement amount of a position of the robot 1 with respect to a relative position amount is predetermined. For example, as a movement amount of a position of the robot 1 in a direction corresponding to the u-axis, a value that is obtained by multiplying the value (u1m−u1b) relevant to the u-axis by a predetermined coefficient can be adopted. Furthermore, as a movement amount of the position of the robot 1 in a direction corresponding to the v-axis, a value that is obtained by multiplying the value (v1m−v1b) relevant to the v-axis by a predetermined coefficient can be adopted. In this way, the movement amount of the position of the robot 1 can be calculated in the directions corresponding to the coordinate axes of the screen coordinate system 53.

Note that in the present embodiment, control in which the workpiece 91 gradually approaches the workpiece 81 is performed. For this reason, the above-described coefficients may be changed according to a movement amount of a position of the robot 1 in a direction in which the workpiece 91 approaches the workpiece 81.

In the present embodiment, a movement amount in the X-axis direction, a movement amount in the Y-axis direction, and a movement amount in the Z-axis direction in the reference coordinate system 51 can be calculated based on the relative position amount relevant to the u-axis. Furthermore, a movement amount in the X-axis direction, a movement amount in the Y-axis direction, and a movement amount in the Z-axis direction in the reference coordinate system 51 can be calculated based on the relative position amount relevant to the v-axis. Because of this, in the reference coordinate system 51, two movement amounts for one coordinate axis (a movement amount relevant to the u-axis and a movement amount relevant to the v-axis) may be calculated. In this case, the position of the robot 1 may not be moved in a direction of a coordinate axis for which the two movement amounts are calculated. Alternatively, a final movement amount may be calculated by multiplying the respective movement amounts by the coefficients. Alternatively, any one of movement amounts may be employed.

Next, in step 135, the robot 1 is driven based on the movement direction and the movement amount of the position of the robot 1. The command generation unit 35 generates the first movement command for driving the robot 1 based on the movement direction and the movement amount of the position of the robot 1. The command generation unit 35 sends the first movement command to the operation control unit 43. The operation control unit 43 changes the position of the robot 1 based on the movement command.

In this way, the command generation unit 35 can perform control in which the position of the robot 1 is changed such that the characteristic amount detected by the characteristic amount detection unit 32 becomes close to the characteristic amount of the reference image based on the characteristic amount in the image captured by the camera 25 and the reference characteristic amount.

With reference to FIG. 4, in step 117, it is determined whether or not the workpiece 91 approaches the workpiece 81. Here, it is determined whether or not the movement amount of the position of the robot 1 exceeds a predetermined determination value. In the present embodiment, it is determined whether or not the position of the robot 1 is moved a predetermined distance in the direction in which the workpiece 91 approaches the workpiece 81. In the example illustrated in FIG. 1, it is determined whether or not the tool tip point is moved a predetermined distance in the direction of the X-axis of the reference coordinate system 51.

In step 117, when the movement amount of the position of the robot 1 exceeds the predetermined determination value, the control ends. In step 117, when the movement amount of the position of the robot 1 is smaller than or equal to the predetermined determination value, the control returns to step 115. Then, the control from step 115 to step 117 is repeated. In this way, the approaching control can be repeated until the second workpiece 91 is close to the first workpiece 81.

Further, in step 117, in the case where the movement amount of the position of the robot 1 exceeds the predetermined determination value, when the projection part 93 of the second workpiece 91 is not sufficiently close to the projection part 83 of the first workpiece 81, the command generation unit 35 may determine that the position is abnormal. For example, in the case where the relative position amount deviates from a predetermined determination range, the command generation unit 35 may perform control so as to stop the robot 1.

In the present embodiment, the control in which the workpiece 91 gradually approaches the workpiece 81 is performed. The size of the characteristic portion in images captured by the camera 25 gradually increases. Therefore, the operator may create a plurality of reference images according to the movement amount of the position of the robot 1 in the direction in which the workpiece 91 approaches the workpiece 81. The characteristic amount detection unit 32 may perform control so as to switch the reference images according to the movement amount of the position of the robot 1 in the direction in which the workpiece 91 approaches the workpiece 81. Alternatively, an acceptable range can be defined for the size of the characteristic portion in the image captured by the camera 25 with respect to the size of the characteristic portion in the reference image. Then, control may be performed so as to switch the reference images when the size of the characteristic portion exceeds the acceptable range.

Figure 10:
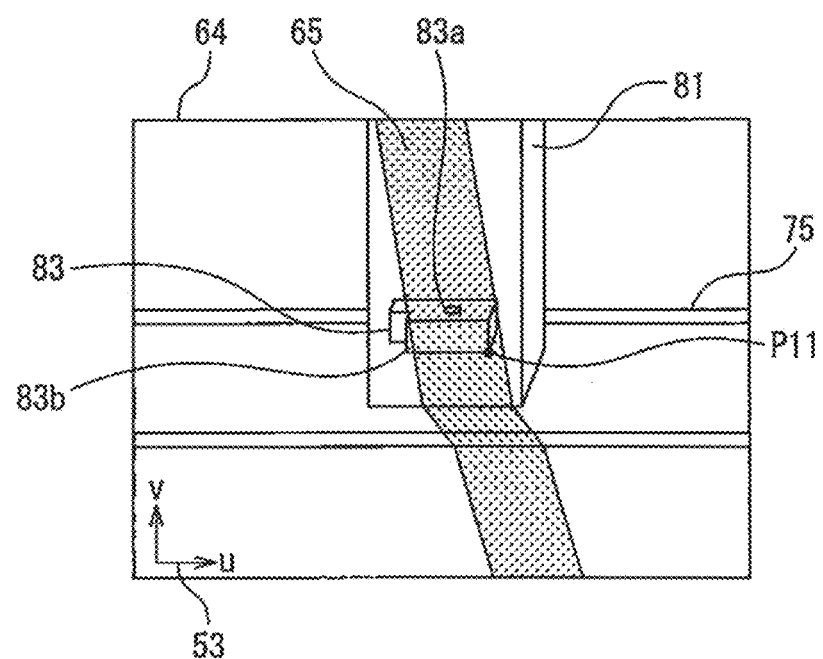
FIG. 10 is another image captured by the first camera when the approaching control is being performed.

FIG. 10 illustrates another image captured by the first camera in the approaching control. When the camera 25 actually captures an image of the workpiece 81, a shadow 65 may be captured in an image 64 depending on a state of light that illuminates the robot apparatus 5. For example, the shadow 65 of a constituent component of the robot apparatus 5 or an object that is disposed around the robot apparatus 5 may be captured in an image. In particular, the shadow 65 is generated due to an arm such as the upper arm 11 and the lower arm 12 of the robot 1, or a fence or the like that is disposed around the robot apparatus 5.

The shadow 65 may appear or may not appear in an image captured by camera 25. For example, when there is a window in a factory where the robot apparatus 5 is placed, there may be a case where sunlight enters or does not enter through the window depending on the time. Also, a position of the shadow 65 in an image captured by the camera 25 may vary. For example, when an angle of sunlight that enters through the window in the factory changes, the position of the shadow 65 in the image 64 may vary.

Alternatively, in the present embodiment, a position and an orientation of the robot 1 vary depending on a position of the workpiece 81 that is carried by the conveyor 75. In a case where auxiliary light is irradiated from a side of the robot apparatus 5 by a spotlight or the like, there may be a case where the shadow 65 is captured or is not captured in the image 64 depending on the position of the workpiece 81 that is carried by the conveyor 75. Also, the position of the shadow 65 in the image 64 may vary.

In step 131 in FIG. 8, the characteristic amount detection unit 32 of the arithmetic processing unit 31 may not be able to detect the characteristic portion in the image 64 captured by the camera 25 due to change in position of the shadow 65. Alternatively, the shadow 65 darkens a part of the characteristic portion, so that the characteristic amount detection unit 32 may not be able to detect the characteristic portion in the image 64.

Thus, the operator can prepare a plurality of base images or reference images in advance according to various states of light that is irradiated to the robot apparatus 5. Here, the reference images will be described as an example. For example, the operator can previously create a plurality of reference images when the angle at which sunlight enters through the window in the factory gradually changes. Alternatively, in the case where the auxiliary light is irradiated from the side of the robot apparatus 5, the operator can previously create a plurality of reference images when a position of the workpiece 81 that changes due to conveyance by the conveyor 75 is gradually changed.

The operator can create a plurality of reference images when a state of the light that is irradiated to the robot apparatus 5 or a position of the workpiece 81 is gradually changed, by predetermining relative positions and relative orientations of the robot 1 with respect to the workpiece 81. That is, the operator generates a plurality of reference images when a state of the shadow is changed. In the plurality of reference images, the shadow 65 is captured or is not captured. Alternatively, in the plurality of reference images, a position of the shadow 65 gradually changes. The plurality of reference images can be stored in the storage part 42.

The characteristic amount detection unit 32 selects one reference image among the plurality of reference images. The order for selecting one reference image among the plurality of reference images can be predetermined. The characteristic amount detection unit 32 determines whether the characteristic portion in the image 64 captured by the camera 25 can be detected or not. When the characteristic amount detection unit 32 determines that the characteristic portion in the image 64 can be detected, the characteristic amount detection unit 32 employs the characteristic portion detected from the reference image. When the characteristic amount detection unit 32 determines that the characteristic portion in the image 64 cannot be detected, the characteristic amount detection unit 32 selects the next reference image and determines whether the characteristic portion in the image 64 captured by the camera 25 can be detected or not. In this way, the characteristic amount detection unit 32 can perform control that changes the reference image until the characteristic portion in the image 64 can be detected.

Any control may be employed as the determination control of whether the characteristic portion can be detected or not. For example, the characteristic amount detection unit can calculate a degree of similarity that indicates a degree of resemblance between an image captured by the camera and a reference image. In the present embodiment, detection of the characteristic portion is performed by the template matching method. While gradually changing a position of a reference image with respect to an image captured by the camera, the characteristic amount detection unit calculates a sum of squares of differences in luminance (pixel value) in the two images. The sum of the squares can be employed as the degree of similarity between the two images. In this case, the smaller the sum of the squares is, the more similar the two images can be determined.

Alternatively, as the degree of similarity of the two images, a normalized cross-correlation function for the two images can be calculated. In this case, as the value of the function is closer to 1, the two images are more similar. The characteristic amount detection unit can determine that the characteristic portion can be detected when the degree of similarity between the two images is within a predetermined determination range. Alternatively, the characteristic amount detection unit may calculate a degree of dissimilarity that represents a degree of difference between two images instead of the degree of similarity.

The characteristic amount detection unit 32 can detect a characteristic amount based on the characteristic portion in the image 64 when the characteristic portion in the image 64 can be detected. In this way, the characteristic portion can be detected even when the image 64 captured by the camera 25 includes the shadow 65. The characteristic portion can be detected even when the state of the light that is irradiated to the robot apparatus 5 changes.

Note that when the characteristic amount detection unit 32 cannot detect the characteristic portion in all the reference images, the command generation unit 35 can perform control for allowing the robot apparatus 5 to stop. Alternatively, the characteristic amount detection unit 32 may select the most similar reference image among the plurality of reference images and may detect the characteristic amount.

In the embodiment described above, the plurality of reference images are generated in consideration of influence by the shadow in the approaching control, but the embodiment is not limited to this. Control in which the plurality of reference images or base images that include the shadow are used as described above can be applied to any control that detects a characteristic portion in an image captured by the camera. For example, the control in which the plurality of reference images or base images that include the shadow are used can be applied to the gripping control, the misalignment detection control, and the position adjustment control that will be described below.

Figure 11:
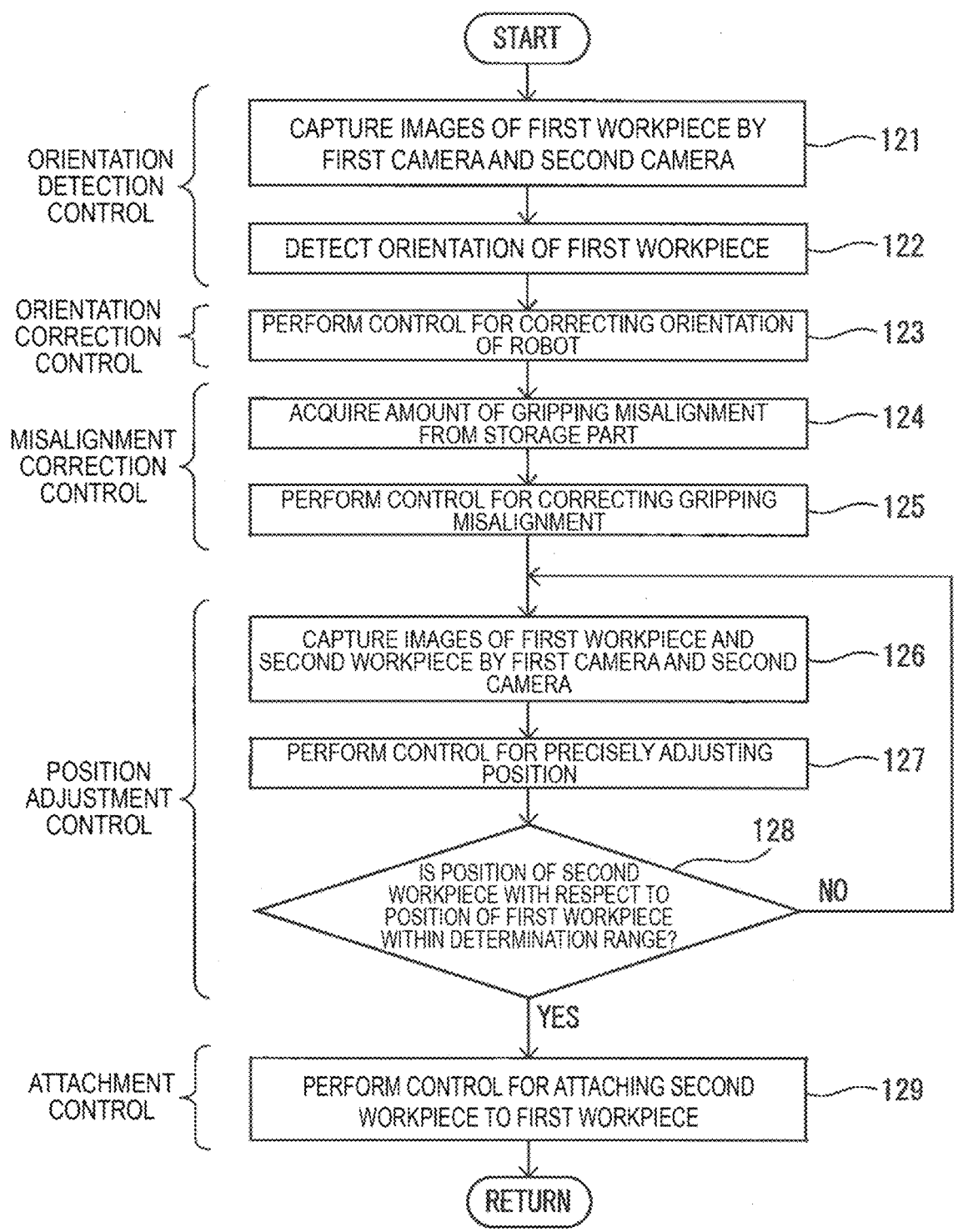
FIG. 11 is a flowchart of orientation detection control, orientation correction control, misalignment correction control, position adjustment control, and attachment control according to the embodiment.
Figure 12:
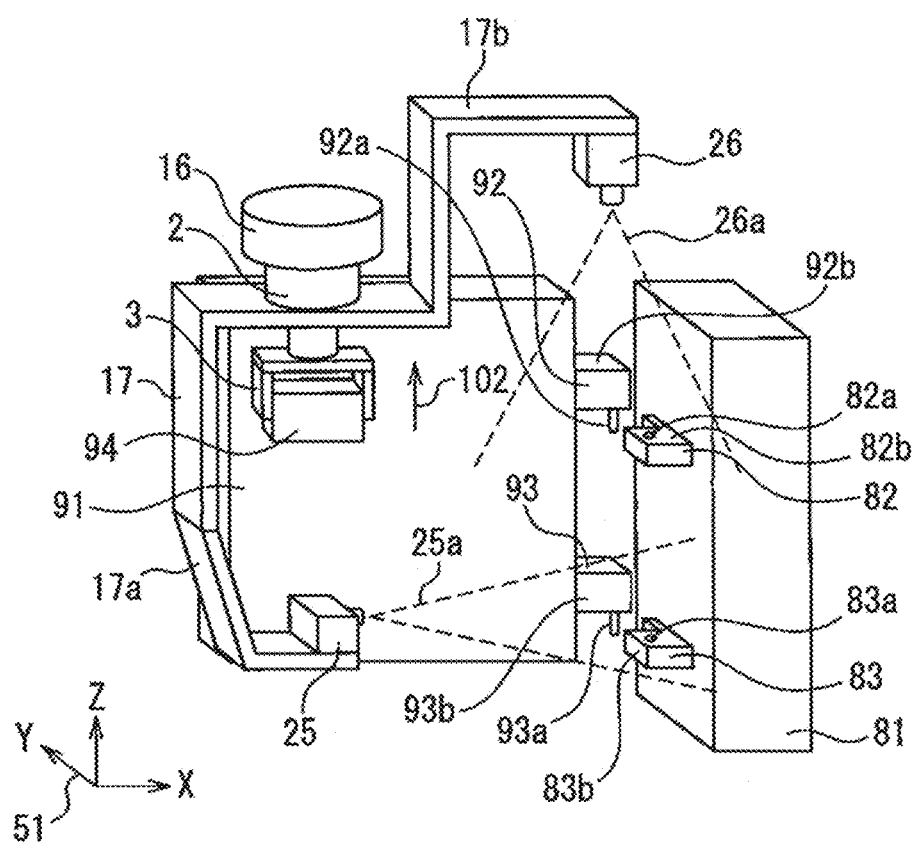
FIG. 12 is an enlarged perspective view of the first workpiece, the second workpiece, and the hand when the second workpiece approaches the first workpiece.

Next, control after the second workpiece approaches the first workpiece will be described. FIG. 11 is a flowchart of the orientation detection control, the orientation correction control, the misalignment correction control, the position adjustment control, and the attachment control according to the present embodiment. FIG. 12 illustrates an enlarged perspective view of the first workpiece, the second workpiece, and the hand when the approaching control according to the present embodiment ends. By performing the approaching control, the pins 92a and 93a of the second workpiece 91 are close to the holes 82a and 83a of the first workpiece 81.

With reference to FIG. 11 and FIG. 12, in step 121 to step 123, the controller 7 of the robot apparatus 5 corrects an orientation of the robot 1 such that an orientation of the second workpiece 91 with respect to the first workpiece 81 becomes a predetermined orientation. The first workpiece 81 is preferably fixed to the conveyor 75 such that an orientation thereof becomes a predetermined orientation. For example, the first workpiece 81 is preferably fixed to the conveyor 75 such that the hole 82a and the hole 83a are vertically aligned. However, the orientation of the first workpiece 81 may deviate from a desired orientation. Thus, in the present embodiment, control for adjusting the orientation of the second workpiece 91 to the orientation of the first workpiece 81 is performed.

In step 121 and step 122, the orientation detection control for detecting an amount of orientation deviation of the first workpiece 81 is performed. In step 121, images of the first workpiece 81 are captured by the first camera 25 and the second camera 26. Characteristic portions for detecting an orientation of the first workpiece 81 are predetermined in the first workpiece 81. The side surface 83b of the projection part 83 is set as the characteristic portion in an image that is to be captured by the camera 25. A top surface 82b of the projection part 82 is set as the characteristic portion in an image that is to be captured by the camera 26. The cameras 25 and 26 capture images of the respective characteristic portions.

In step 122, the orientation detection unit 34 detects an orientation of the first workpiece 81. In the present embodiment, a base image of a characteristic portion relevant to an image that is to be captured by one camera is created in advance. Furthermore, a plurality of base images when an orientation of the first workpiece 81 changes for each minute angle are generated in advance. Each base image is stored in the storage part 42 along with the orientation of the first workpiece 81 corresponding to the base image. That is, the orientation of the first workpiece 81 is stored in association with the base image.

The orientation detection unit 34 acquires an image captured by the first camera 25. The orientation detection unit 34 selects the base image that has the highest degree of matching with the image of the side surface 83b of the projection part 83 in the image captured by the camera 25 by the template matching method. Because the orientation of the first workpiece 81 is stored in associated with the base image, the orientation detection unit 34 can detect the orientation of the first workpiece 81. Such an orientation of the first workpiece 81 can be detected by using coordinate values in the reference coordinate system 51.

Further, as for an image that is to be captured by the second camera 26, a plurality of base images that include the top surface 82b of the projection part 82 when an orientation of the first workpiece 81 is changed can be generated in advance. The orientation detection unit 34 can detect the orientation of the first workpiece 81 by processing similar to the processing of the image captured by the first camera 25.

The orientation detection unit 34 detects the final orientation of the first workpiece 81 based on the orientation that is acquired from the image captured by the camera 25 and the orientation that is acquired from the image captured by the camera 26. The orientation of the first workpiece 81 that is detected from the image by each of the cameras 25 and 26 can be represented by, for example, a coordinate value of a W-axis, a coordinate value of a P-axis, and a coordinate value of an R-axis in the reference coordinate system 51. The orientation detection unit 34 can multiply a coordinate value that is calculated from the image by the camera 25 and a coordinate value that is detected from the image by the camera 26 by coefficients and then add the multiplied values for each coordinate axis. Alternatively, for each coordinate axis of the W-axis, the P-axis, and the R-axis, a coordinate value acquired from an image by any one of the cameras may be employed.

In the orientation detection control according to the present embodiment, an orientation of the first workpiece 81 is detected based on images by the plurality of cameras 25 and 26. Due to this, an orientation of the workpiece can be detected accurately, compared with a case where control in which an orientation of the workpiece is detected based on an image by one camera is performed.

Next, in step 123, the orientation correction control for correcting an orientation of the robot 1 is performed. The command generation unit 35 corrects the orientation of the robot 1 based on the orientation of the first workpiece 81 calculated from the images by the cameras 25 and 26. In the orientation correction control, the orientation of the robot 1 is corrected such that an orientation of the second workpiece 91 with respect to the first workpiece 81 becomes a predetermined orientation. The command generation unit 35 generates a movement command for correcting the orientation of the robot 1 such that a direction in which the pin 92a and the pin 93a are aligned is mutually parallel to a direction in which the hole 82a and the hole 83a are aligned. Because the orientation of the robot 1 is predetermined in the approaching control, the orientation of the second workpiece 91 is predetermined. The command generation unit 35 generates the movement command for correcting the orientation of the robot 1 based on the orientation of the first workpiece 81. The operation control unit 43 corrects the orientation of the robot based on the movement command from the command generation unit 35.

By performing the orientation correction control, an orientation of the second workpiece 91 with respect to the first workpiece 81 can be corrected even when the first workpiece 81 is inclined with respect to the desired orientation. The orientation correction control according to the present embodiment can be performed after the approaching control. The orientation correction control can also be performed before the position adjustment control.

The orientation detection control and the orientation correction control may be performed based on an image captured by one of the plurality of cameras 25 and 26. Alternatively, when the first workpiece 81 is adjusted so as to be in the desired orientation, the orientation correction control may not be performed. Furthermore, in a case where the orientation correction control is not performed, before the position adjustment control is performed, whether or not an orientation of the second workpiece with respect to the first workpiece is within a predetermined acceptable range may be determined based on an amount of orientation deviation detected by the orientation detection control. When the orientation of the second workpiece with respect to the first workpiece deviates from the predetermined acceptable range, the arithmetic processing unit 31 may determine that the orientation is abnormal and may stop the robot apparatus 5. Further, when the first workpiece 81 is adjusted so as to be in the desired orientation and whether or not an orientation of the second workpiece 91 with respect to the first workpiece 81 is within the predetermined acceptable range is not determined, the orientation detection control and the orientation correction control may not be performed.

Next, in step 124 and step 125, the controller 7 of the robot apparatus 5 performs the misalignment correction control that corrects the gripping misalignment when the second workpiece 91 is gripped. In step 124, the command generation unit 35 acquires the amount of misalignment detected by the misalignment detection control in step 113 and step 114 in FIG. 4 from the storage part 42.

In step 125, the command generation unit 35 generates a movement command for correcting the position of the robot 1 so as to cancel out the amount of gripping misalignment based on the amount of gripping misalignment. The command generation unit 35 generates the movement command for allowing the hand 2 to move in a direction opposite to a direction in which the second workpiece 91 is misaligned with respect to the hand 2. In the example illustrated in FIG. 12, the command generation unit 35 generates the movement command for allowing the hand 2 to move upward, as indicated by an arrow 102. A movement amount of the robot 1 can be calculated according to the amount of misalignment. Then, the operation control unit 43 corrects the position of the robot 1 based on the movement command from the command generation unit 35.

By performing the misalignment correction control, the misalignment that occurs when the second workpiece 91 is gripped by the hand 2 can be corrected. The misalignment correction control can be performed after the approaching control. The misalignment correction control can also be performed before the position adjustment control.

Note that when the hand grips the second workpiece, the misalignment detection control and the misalignment correction control may not be performed in a case where the second workpiece is gripped at the predetermined position of the hand. Furthermore, when the misalignment detection control and the misalignment correction control are not performed, whether or not a position of the second workpiece with respect to the first workpiece is within the predetermined acceptable range may be determined before the position adjustment control is performed. When the position of the second workpiece with respect to the first workpiece deviates from the predetermined acceptable range, the arithmetic processing unit 31 may determine that the position is abnormal and may stop the robot apparatus 5.

Next, in step 126 to step 128, the position adjustment control for adjusting the position of the second workpiece 91 with respect to the position of the first workpiece 81 is performed. The position adjustment control is performed after the second workpiece 91 approaches the first workpiece 81. In the position adjustment control, the position of the second workpiece 91 with respect to the first workpiece 81 is adjusted based on the image captured by the first camera 25 and the image captured by the second camera 26. In the position adjustment control, the second workpiece 91 is positionally aligned with respect to the first workpiece 81 with higher precision than the approaching control.

After the approaching control ends, the projection part 83 of the first workpiece 81 is close to the projection part 93 of the second workpiece 91. Further, the projection part 92 of the second workpiece 91 is close to the projection part 82 of the first workpiece 81. Thus, an image of the projection part 82 and the projection part 92 can be captured by the camera 26.

In regard to an image that is to be captured by the camera 25, the side surface 83b of the projection part 83 is predetermined as a first characteristic portion of the first workpiece 81 for the position adjustment control. Furthermore, the side surface 93b of the projection part 93 is predetermined as a second characteristic portion of the second workpiece 91 for position adjustment control. The side surface 83b and the side surface 93b are positioned inside the image-capturing range 25a of the camera 25. Further, in regard to an image that is to be captured by the camera 26, the top surface 82b of the projection part 82 is predetermined as a third characteristic portion of the first workpiece 81 for the position adjustment control. Furthermore, the top surface 92b of the projection part 92 is predetermined as a fourth characteristic portion of the second workpiece 91 for the position adjustment control. The top surface 82b and the top surface 92b are positioned inside an image-capturing range 26a of the camera 26.

In the position adjustment control, the characteristic portions are set for each of the workpieces 81 and 91. In the position adjustment control according to the present embodiment, the position of the workpiece 91 with respect to the workpiece 81 is adjusted based on a plurality of characteristic portions that are included in one image.

In step 126, the first camera 25 captures an image of the side surface 83b of the projection part 83 and the side surface 93b of the projection part 93. The second camera 26 captures images of the top surface 82b of the projection part 82 and the top surface 92b of the projection part 92.

Figure 13:
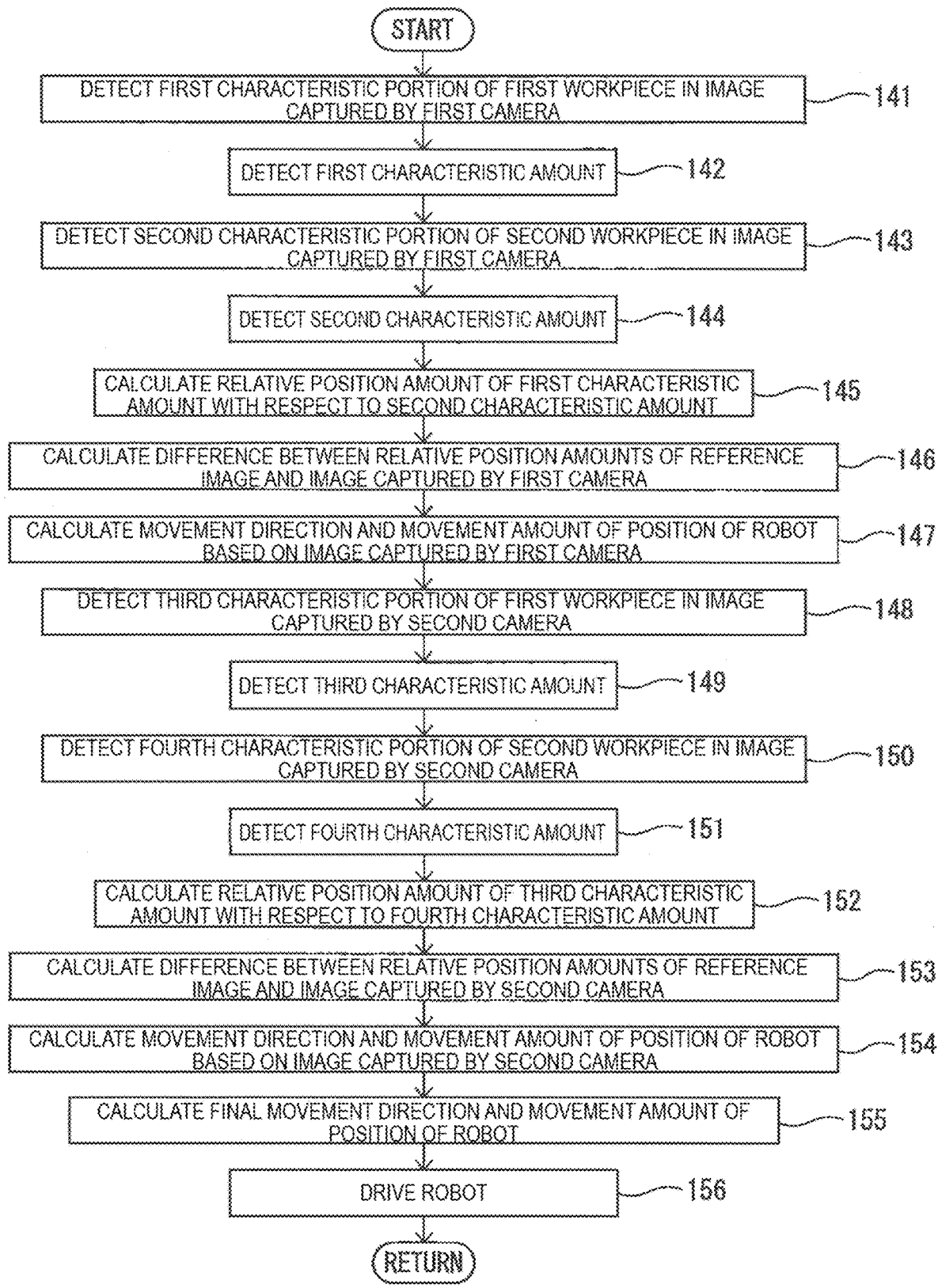
FIG. 13 is a flowchart of control that is included in the position adjustment control.

Next, in step 127, control for precisely adjusting the position of the second workpiece 91 with respect to the first workpiece 81 is performed. FIG. 13 illustrates a flowchart of the control for precisely adjusting the position of the second workpiece with respect to the first workpiece. The control illustrated in FIG. 13 corresponds to the control in step 127 in FIG. 11.

Figure 14:
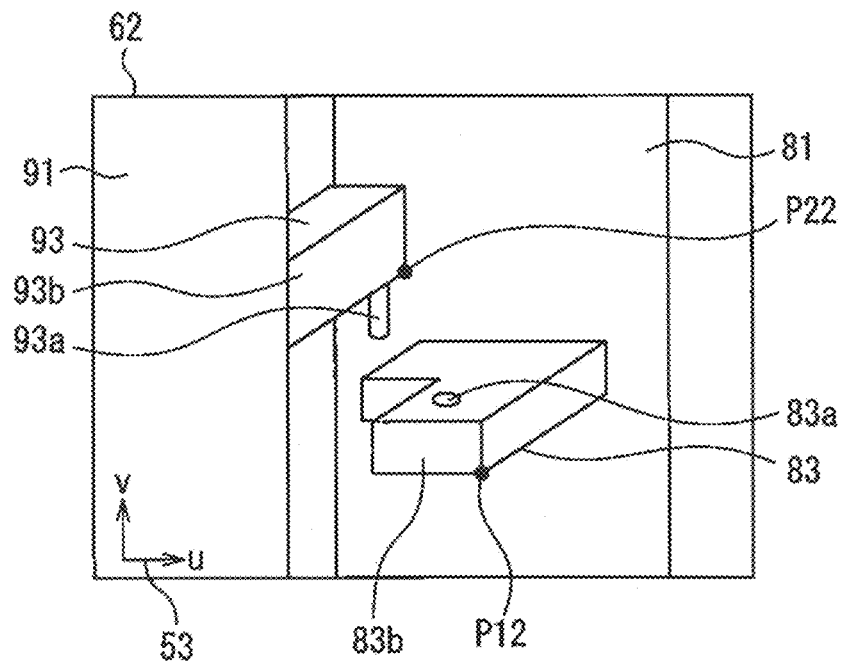
FIG. 14 is an image captured by the first camera in the position adjustment control.

FIG. 14 illustrates an image captured by the first camera in the position adjustment control. With reference to FIG. 12 to FIG. 14, in step 141, the characteristic amount detection unit 32 detects the first characteristic portion of the first workpiece 81 in an image 62. Here, the characteristic amount detection unit 32 detects the side surface 83b of the projection part 83 by the template matching method.

In step 142, the characteristic amount detection unit 32 detects a first characteristic amount of the first characteristic portion. A set point P12 is set on the side surface 83b of the projection part 83. The characteristic amount detection unit 32 detects the set point P12. The characteristic amount detection unit 32 detects, as the first characteristic amount, coordinate values (u12m, v12m) of the set point P12 in the screen coordinate system 53.

In step 143, the characteristic amount detection unit 32 detects the second characteristic portion of the second workpiece 91 in the image 62. Here, the characteristic amount detection unit 32 detects the side surface 93b of the projection part 93 by the template matching method. A set point P22 is set on the side surface 93b of the projection part 93. In step 144, the characteristic amount detection unit 32 detects, as a second characteristic amount, coordinate values (u22m, u22m) of the set point P22 in the screen coordinate system 53.

In step 145 to step 147, the command generation unit 35 calculates a movement direction and a movement amount of the position of the robot 1 based on the first characteristic amount and the second characteristic amount. The command generation unit 35 calculates the movement direction and the movement amount of the position of the robot 1 such that the pin 93a is positioned directly above the hole 83a. In step 145, the command generation unit 35 calculates a difference between the first characteristic amount and the second characteristic amount as a relative position amount. The relative position amount in the image 62 captured by the camera 25 is differences between the coordinate values of the first characteristic amount and the coordinate values of the second characteristic amount (u12m−u22m, v12m−v22m). The command generation unit 35 calculates the relative position amount of the first characteristic amount with respect to the second characteristic amount.

Figure 15:
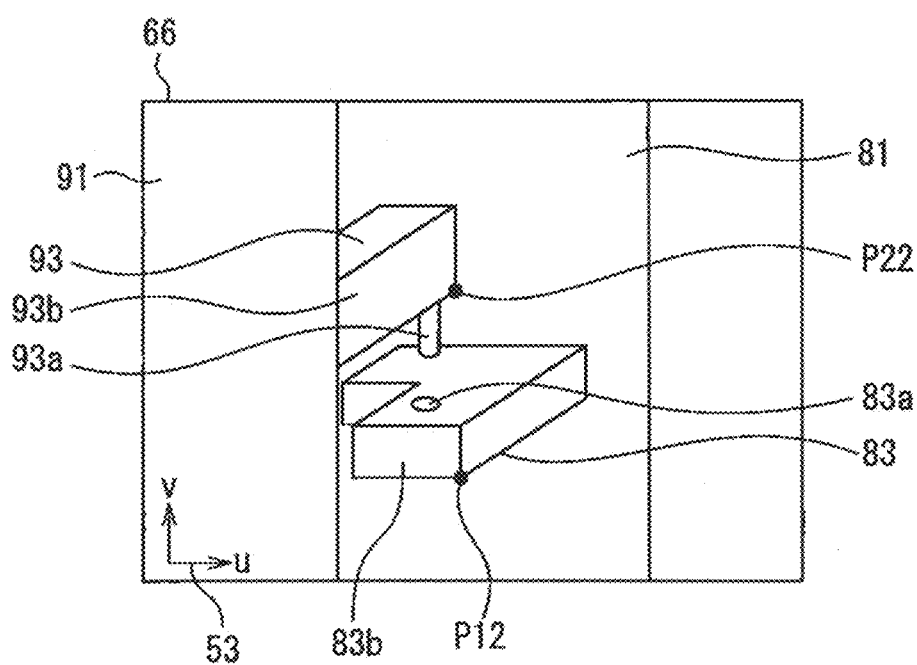
FIG. 15 is a reference image for an image that is to be captured by the first camera in the position adjustment control.

FIG. 15 illustrates a reference image corresponding to an image captured by the first camera in the position adjustment control. A reference image 66 can be created in advance. In the reference image 66, the pin 93a is positioned directly above the hole 83a. A relative position amount of the first characteristic amount with respect to the second characteristic amount in the reference image 66 is calculated in advance. Alternatively, the command generation unit 35 may calculate the relative position amount of the first characteristic amount with respect to the second characteristic amount based on the reference image 66. The differences between the coordinate values of the first characteristic amount and the coordinate values of the second characteristic amount may be represented as (u12b−u22b, v12b−v22b) by using the coordinate values of the set point P12 and the set point P22 in the screen coordinate system 53.

Next, in step 146, the command generation unit 35 calculates a difference in relative position amount that is a difference between the relative position amount in the images 62 captured by the camera 25 and the relative position amount in the reference images 66. In the present embodiment, the command generation unit 35 calculates a difference in the relative position amount that is obtained by subtracting the relative position amount in the reference image 66 from the relative position amount in the image 62 captured by the camera 25. The difference in relative position amount can be expressed as values [(u12m−u22m)−(u12b−u22b), (v12m−v22m)−(v12b−v22b)] relevant to the respective u-axis and v-axis. In this way, in the present embodiment, the difference in relative position amount relevant to the u-axis and the difference in relative position amount relevant to the v-axis are calculated.

Next, in step 147, the command generation unit 35 sets a driving method for the robot 1 based on the difference in relative position amount. The command generation unit 35 sets the movement direction and the movement amount of the position of the robot 1 in the reference coordinate system 51. In the present embodiment, a movement direction of a position of the robot with respect to a difference in relative position amount is predetermined. A movement direction of a position of the robot 1 with respect to a positive value or a negative value of the u-axis in the screen coordinate system 53 is defined in the reference coordinate system 51.

Furthermore, a method for calculating a movement amount of a position of the robot 1 with respect to a difference in relative position amount is predetermined. For example, as a movement amount of a position of the robot 1 in the direction corresponding to the u-axis, a value that is obtained by multiplying the value ((u12m−u22m)−(u12b−u22b)) relevant to the u-axis by a predetermined coefficient can be adopted. Furthermore, as a movement amount of a position of the robot 1 in the direction corresponding to the v-axis, a value that is obtained by multiplying the value ((v12m−v22m)−(v12b−v22b)) relevant to the v-axis by a predetermined coefficient can be adopted. In this way, the movement amount of the position of the robot 1 can be calculated in the direction corresponding to each axis of the screen coordinate system 53.

In the present embodiment, a movement amount in the X-axis direction, a movement amount in the Y-axis direction, and a movement amount in the Z-axis direction in the reference coordinate system 51 are calculated based on the difference in relative position amount relevant to the u-axis. Furthermore, a movement amount in the X-axis direction, a movement amount in the Y-axis direction, and a movement amount in the Z-axis direction in the reference coordinate system 51 are calculated based on the difference in relative position amount relevant to the v-axis. Therefore, in the reference coordinate system 51, two movement amounts (the movement amount relevant to the u-axis and the movement amount relevant to the v-axis) for one axis may be calculated. In this case, the position of the robot 1 may not be moved in the direction corresponding to the axis in which the two movement amounts are calculated. Alternatively, a final movement amount may be calculated by multiplying the respective movement amounts by the coefficients. Alternatively, any one of movement amounts may be employed. In this way, the movement direction and the movement amount of the position of the robot are calculated based on the image captured by the first camera 25.

Next, in step 148 to step 154, processing similar to the processing of the image captured by the first camera 25 can be performed on an image captured by the second camera 26.

Figure 16:
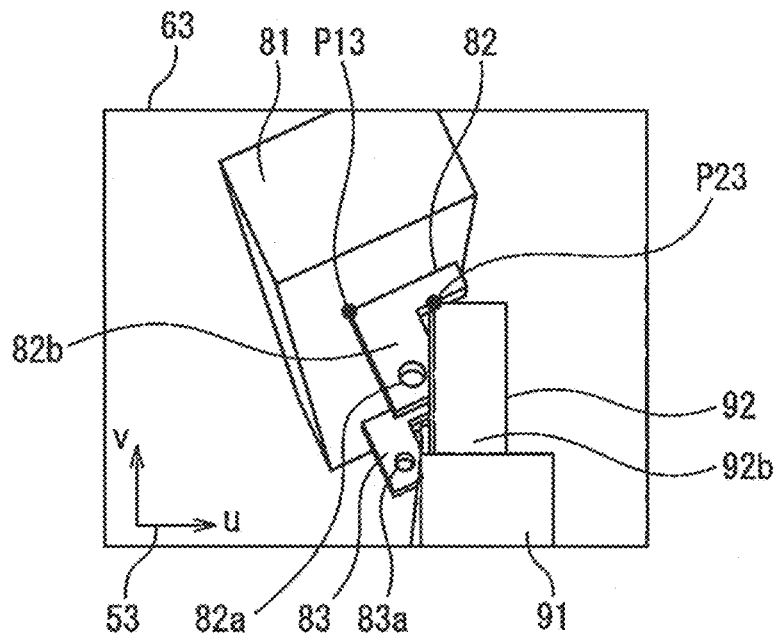
FIG. 16 is an image captured by a second camera in the position adjustment control.

FIG. 16 illustrates an image captured by the second camera in the position adjustment control. A set point P13 is set on the top surface 82b of the projection part 82 as the third characteristic portion of the first workpiece 81. A set point P23 is set on the top surface 92b of the projection part 92 as the fourth characteristic portion of the second workpiece 91.

In step 148, the characteristic amount detection unit 32 detects the top surface 82b of the projection part 82 which is the third characteristic portion of the first workpiece 81. In step 149, the characteristic amount detection unit 32 detects coordinate values of the set point P13 in the screen coordinate system 53 as a third characteristic amount relevant to the third characteristic portion. In step 150, the characteristic amount detection unit 32 detects the top surface 92b of the projection part 92 which is the fourth characteristic portion of the second workpiece 91. In step 151, the characteristic amount detection unit 32 detects coordinate values of the set point P23 in the screen coordinate system 53 as a fourth characteristic amount relevant to the fourth characteristic portion.

Figure 17:
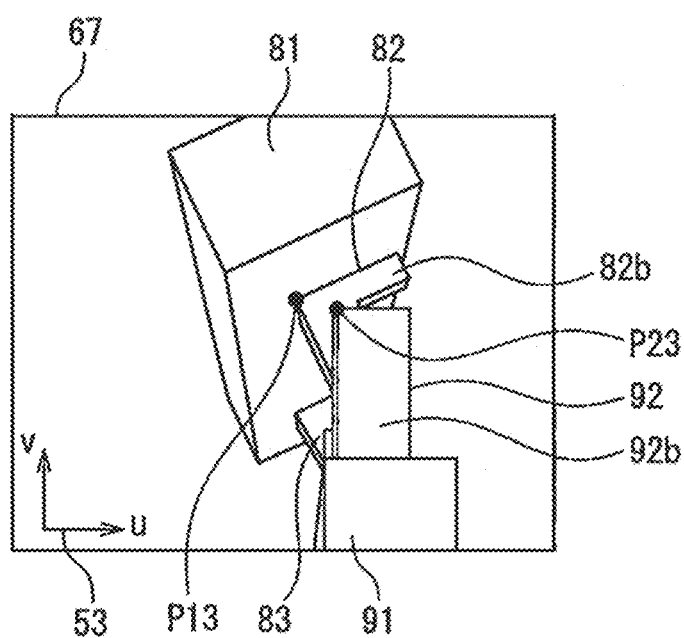
FIG. 17 is a reference image for an image that is to be captured by the second camera in the position adjustment control.

FIG. 17 illustrates a reference image corresponding to an image captured by the second camera in the position adjustment control. In a reference image 67, the pin 92a is positioned directly above the hole 82a. In step 152 to step 154, the command generation unit 35 calculates a movement direction and a movement amount of the position of the robot 1 based on the third characteristic amount and the fourth characteristic amount.

In step 152, the command generation unit 35 calculates a relative position amount of the third characteristic amount with respect to the fourth characteristic amount. In step 153, the command generation unit 35 calculates a difference in relative position amount relevant to the reference image 67 and the image captured by the second camera 26. In step 154, the movement direction and the movement amount of the position of the robot are calculated based on the difference in relative position amount.

Next, in step 155, the command generation unit 35 sets the final movement direction and movement amount of the position of the robot 1, based on the movement direction and movement amount of the position of the robot 1 based on the image 62 by the first camera 25 and the movement direction and movement amount of the position of the robot 1 based on the image 63 by the second camera 26. The movement direction and the movement amount of the position of the robot 1 can be calculated by using the reference coordinate system 51.

In regard to the image 62 captured by the first camera 25, mainly, a position in the Y-axis direction and the Z-axis direction in the reference coordinate system 51 can be adjusted. In regard to the image 63 captured by the second camera 26, mainly, a position in the X-axis direction and the Y-axis direction in the reference coordinate system 51 can be adjusted. Accordingly, in regard to the movement in the Z-axis direction of the position of the robot 1, the movement amount that is acquired from the image 62 captured by the first camera 25 can be employed. In regard to the movement in the X-axis direction of the position of the robot 1, the movement amount that is acquired from the image 63 captured by the second camera 26 can be employed. In regard to the movement in the Y-axis direction of the position of the robot 1, the movement amount based on the image by the first camera 25 and the movement amount based on the image by the second camera 26 can be multiplied by coefficients and summed up. For example, the movement amount that is acquired from the image by the camera 25 and the movement amount that is acquired from the image by the camera 26 may be averaged. In this way, the final driving method for the robot can be set.

Next, in step 156, the command generation unit 35 can generate a second movement command based on the final movement direction and movement amount of the robot. The operation control unit 43 changes the position and the orientation of the robot based on the second movement command.

In the above-described position adjustment control, the position adjustment control is performed based on the image captured by the first camera and the image captured by the second camera, but the embodiment is not limited to this. The position adjustment control may be precisely performed based on an image by one camera without using images by a plurality of cameras. For example, the robot may be driven based on a difference in relative position amount that is calculated from an image by the first camera.

Furthermore, in the above-described position adjustment control, the movement amount of the robot is calculated based on the difference in relative position amount between the reference image and the image captured by each of the cameras, but the embodiment is not limited to this. Any control can be performed based on the image by the first camera and the image by the second camera. For example, by using a method in which calibration is performed in advance, a three-dimensional position of a characteristic portion that is included in an image captured by each camera can be detected. Then, the movement direction and the movement amount of the robot may be calculated such that the characteristic portion of the second workpiece is positioned at a desired position with respect to the characteristic portion of the first workpiece.

Next, with reference to FIG. 11, in step 128, it is determined whether or not the position of the second workpiece 91 with respect to the position of the first workpiece 81 is within a determination range. The determination in this control can be performed by any control. For example, the camera 25 captures an image of the first characteristic portion and the second characteristic portion. The characteristic amount detection unit 32 detects the first characteristic amount and the second characteristic amount. Next, the arithmetic processing unit 31 calculates a relative position amount which is a difference between the first characteristic amount and the second characteristic amount. The relative position amount can be calculated for each coordinate axis of the screen coordinate system 53. The arithmetic processing unit 31 determines whether or not each relative position amount is within a predetermined determination value range. Similarly, the camera 26 captures images of the third characteristic portion and the fourth characteristic portion and the third characteristic amount and the fourth characteristic amount are detected. Then, the arithmetic processing unit 31 determines whether or not the relative position amount which is a difference between the third characteristic amount and the fourth characteristic amount is within a predetermined determination range.

When the relative position amount in the image by the camera 25 and the relative position amount in the image by the camera 26 are within the determination range, it is possible to determine that the position of the second workpiece 91 with respect to the position of the first workpiece 81 is within the determination range.

In step 128, when the position of the second workpiece with respect to the position of the first workpiece deviates from the determination range, the control returns to step 126. By repeating the control from step 126 to step 128, precise positional alignment of the second workpiece 91 with respect to the first workpiece 81 can be performed. Alternatively, in the position adjustment control according to the present embodiment, the difference in relative position amount is calculated based on the images by the respective cameras. The arithmetic processing unit may determine whether the difference in relative position amount is within the predetermined determination value range when the control for precisely adjusting position in step 127 is performed (see FIG. 13). The robot may be driven when the difference in relative position amount deviates from the predetermined determination value range.

Figure 18:
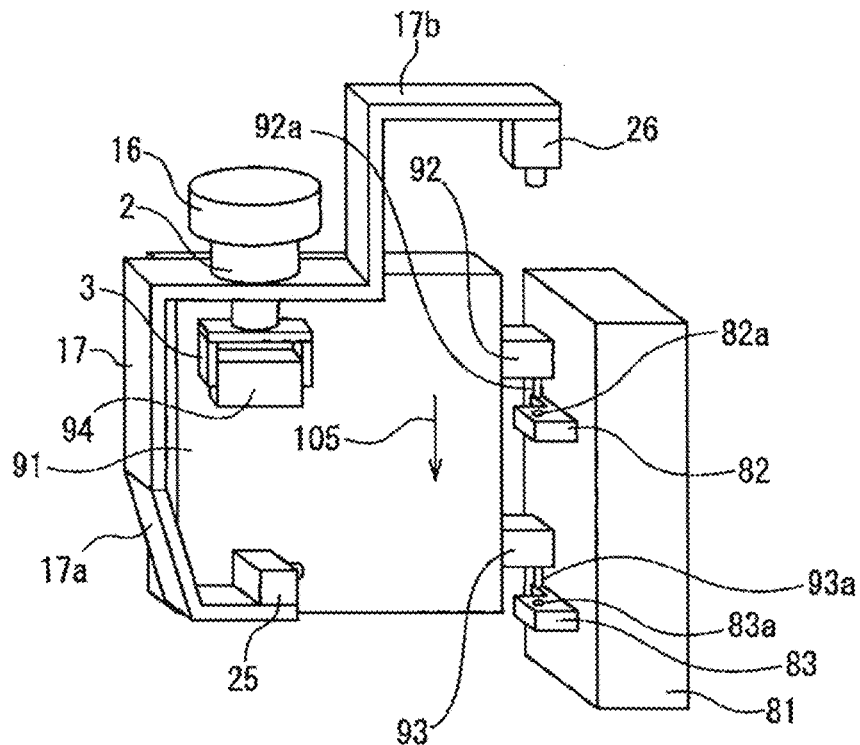
FIG. 18 is an enlarged perspective view of the first workpiece, the second workpiece, and the hand when the position adjustment control is completed.

FIG. 18 illustrates an enlarged perspective view of the first workpiece, the second workpiece, and the hand when the position adjustment control ends. By performing the position adjustment control, the pin 92a can be positioned directly above the hole 82a. Also, the pin 93a can be positioned directly above the hole 83a.

With reference to FIG. 11, in step 128, when the position of the second workpiece 91 with respect to the position of the first 81 is within the determination range, the control is shifted to step 129. In step 129, the attachment control for attaching the second workpiece 91 to the first workpiece 81 is performed.

With reference to FIG. 18, in the attachment control, the control for moving the second workpiece 91 down is performed, as indicated by an arrow 105, with respect to the first workpiece 81. In the example here, the command generation unit 35 sends a movement command for moving the position of the robot 1 to a lower side in a vertical direction (a direction in which the pin 92a and the pin 93a are aligned) to the operation control unit 43. The operation control unit 43 drives the robot 1 so as to move the second workpiece 91 down.

Note that, in the attachment control, force or moment that is applied to the robot or the hand may be detected, and the pins 92a and 93a may be inserted. For example, a force sensor can be disposed between the flange 16 and the hand 2 of the robot 1. The force and moment that are applied to the hand can be detected by the force sensor. Additionally, control for adjusting a position and an orientation of the robot 1 may be performed such that the force and moment that are applied to the hand are reduced.

Figure 19:
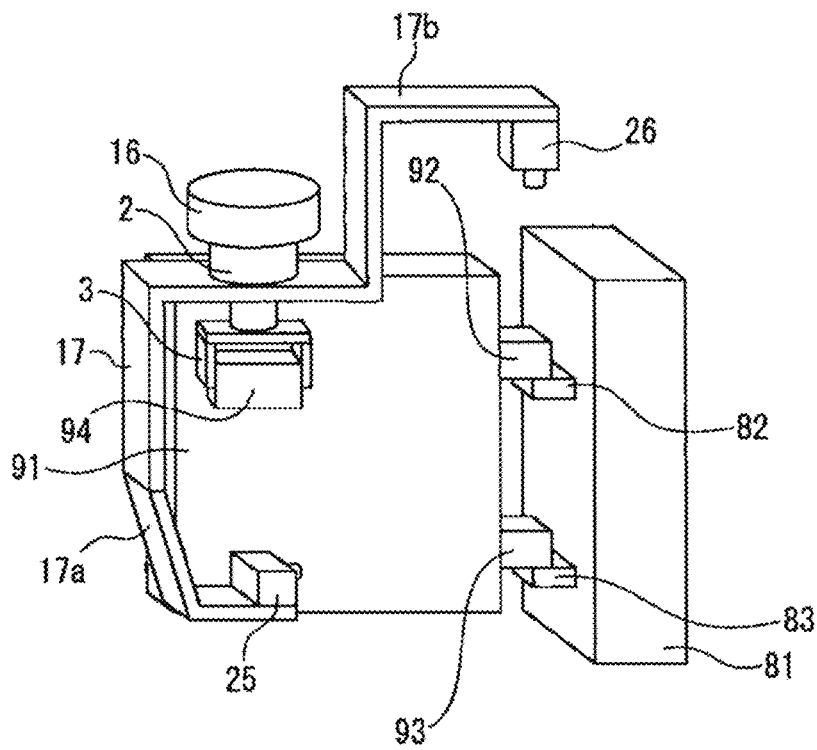
FIG. 19 is an enlarged perspective view of the first workpiece, the second workpiece, and the hand when the attachment control ends.

FIG. 19 illustrates an enlarged perspective view of the first workpiece, the second workpiece, and the hand when the attachment control ends. With reference to FIG. 18 and FIG. 19, the pins 92a and 93a of the second workpiece 91 are inserted into the holes 82a and 83a of the first workpiece 81. In this way, the control for attaching the second workpiece 91 to the first workpiece 81 can be performed.

In the approaching control according to the present embodiment, a position of the second member is roughly adjusted based on an image captured by the first vision sensor. Further, in the position adjustment control, the position of the second member is precisely adjusted based on an image captured by the first vision sensor and an image captured by the second vision sensor. Accordingly, the position of the second member can be adjusted in a short time. Furthermore, the position of the second member can be precisely adjusted.

Additionally, the first vision sensor and the second vision sensor according to the present embodiment are two-dimensional cameras. For this reason, a position of a workpiece can be adjusted with a simple configuration compared to a case where a three-dimensional camera is employed. Note that the two-dimensional camera may not be able to automatically adjust a focus. In this case, in the position adjustment control, it is preferable to adjust such that the two-dimensional cameras are brought into focus.

In the present embodiment, the conveyor 75 carries the first workpiece 81. The position of the second workpiece 91 with respect to the first workpiece 81 can be adjusted while the second workpiece 91 is allowed to follow the first workpiece 81 by repeatedly performing the approaching control or the position adjustment control during a period in which the first workpiece 81 is conveyed by the conveyor 75.

Further, in the present embodiment, a movement direction and a movement speed of the first workpiece 81 by the conveyor 75 are predetermined. The robot controller 4 can perform feedforward control for changing a position of the robot 1 according to movement of the workpiece 81 by the conveyor 75. In the present embodiment, the workpiece 81 moves at a fixed movement speed. Note that the movement direction and the movement speed of the first workpiece by the conveyor may not be predetermined. In this case, the command generation unit can estimate the future movement direction and movement speed from the last movement direction and movement speed of the first workpiece, and can estimate the future movement direction and movement speed based on a pattern of change in movement direction and movement speed that has been learned in advance, for example.

The command generation unit 35 calculates a movement direction and a movement amount of a position of the robot 1 based on the movement direction and the movement speed of the workpiece 81 by the conveyor 75. The command generation unit 35 calculates a movement direction and a movement speed of a position of the robot 1 such that a position of the robot 1 follows a position of the first workpiece 81 that is moved by the conveyor 75. For example, the command generation unit 35 calculates the movement direction such that the tool tip point of the robot 1 moves in the movement direction of the workpiece 81. The command generation unit 35 calculates the movement amount such that the tool tip point of the robot 1 moves in the same direction as the movement direction of the workpiece 81 at the same movement speed as the workpiece 81. In addition to controlling a movement direction and a movement amount of a position of the robot 1 based on the conveyance of the conveyor 75, the command generation unit 35 can perform the control for changing a position and an orientation of the robot 1 described above. For example, the feedforward control can be performed while the approaching control, the orientation detection control, the orientation correction control, the misalignment correction control, the position adjustment control, and the attachment control that have been described above are performed.

By performing this control, changes of the position and the orientation of the robot 1 for the movement of the first workpiece 81 by the conveyor 75 can be performed by the feedforward control. In the approaching control or the like, it is sufficient to correct the relative positional misalignment and orientation deviation of the second workpiece 91 with respect to the first workpiece 81, so it is possible to accurately correct the position and the orientation of the second workpiece 91 with respect to the first workpiece 81.

In the above-described embodiment, the first member that is a target of positional alignment is conveyed by the conveyor. In other words, the positional alignment of the second member is performed so as to follow the first member that is moved by the conveyor, but the embodiment is not limited to this. The first member may be stationary. For example, when a position of the second workpiece is aligned with respect to the first workpiece that is fixed to a workbench, the control according to the present embodiment can be applied.

When the first member is stationary, the above-described feedforward control does not need to be performed. Furthermore, as a timing for terminating the approaching control, a determination value of a movement amount of the robot when the second member is allowed to approach the first member can be predetermined. The approaching control can end when the movement amount of the robot exceeds the determination value. Alternatively, whether or not the second member approaches the first member by a predetermined distance is determined, and the approaching control may end when the second member approaches the first member by the predetermined distance.

In the embodiment described above, the camera 25 as the first vision sensor and the camera 26 as the second vision sensor are supported by the hand 2, but the embodiment is not limited to this. The first vision sensor may be supported by the robot. The second vision sensor may also be supported by the robot. For example, the first vision sensor and the second vision sensor may be supported by the flange of the robot and may be formed such that positions and orientations thereof may be changed together with the hand.

The auxiliary sensor according to the present embodiment that detects gripping misalignment is the two-dimensional camera, but the embodiment is not limited to this. An amount of gripping misalignment of the second workpiece 91 can be detected by any method. For example, the auxiliary sensor may be a three-dimensional camera. By employing the three-dimensional camera, a position of the hand and a position of the second workpiece can be detected. In addition, an amount of gripping misalignment of the second workpiece can be detected based on the position of the hand and the position of the second workpiece.

In the embodiment described above, the robot apparatus for assembling a product is exemplified, but the embodiment is not limited to this. The controller according to the present embodiment can be applied to any robot apparatus that conveys a member. Further, the first member according to the present embodiment is a workpiece, but the embodiment is not limited to this. As the first member, any member on which the robot apparatus performs a task can be employed. For example, the robot apparatus may perform a task for housing a workpiece that is gripped by the hand in a predetermined position of a case. In this case, the first member corresponds to the case that houses the workpiece. Further, the second member according to the present embodiment is a workpiece, but the embodiment is not limited to this. As the second member, any member can be employed. For example, the second member may be a device that performs a task on the first member, or the like.

The above-described embodiment can be combined as appropriate. Additionally, in each control described above, the order of the steps can be changed as appropriate as long as the function and the effect are not changed.

According to one aspect of the present disclosure, it is possible to provide a controller of a robot apparatus that accurately performs positional alignment after the robot carries a member.

In each of the above figures, the same or mutually equivalent portions are denoted by the same reference signs. Note that the above-described embodiment is merely examples and is not intended to limit the invention. Further, the embodiment encompasses modifications of the embodiment set forth in the claims.

The invention claimed is:

1. A controller of a robot apparatus configured to adjust a relative position of a second member with respect to a first member by moving the second member by a robot, the controller comprising:
   a first vision sensor configured to capture an image of the first member;
   a second vision sensor configured to capture an image of the first member and the second member from a direction different from a direction of the first vision sensor;
   an arithmetic processing unit configured to generate a movement command for the robot; and
   an operation control unit configured to drive the robot based on the movement command; wherein
   the controller is formed in such a manner that approaching control for making the second member positioned away from the first member approach the first member, and position adjustment control for adjusting a position of the second member with respect to a position of the first member after the second member approaches the first member are performed,
   the approaching control includes control in which the arithmetic processing unit calculates a movement direction and a movement amount of a position of the robot based on an image captured by the first vision sensor and generates a first movement command that allows the second member to approach the first member, and control in which the operation control unit changes a position of the robot based on the first movement command, and the position adjustment control includes control in which the arithmetic processing unit calculates a movement direction and a movement amount of a position of the robot based on an image captured by the first vision sensor and an image captured by the second vision sensor and generates a second movement command that allows a position of the first member with respect to the second member to be adjusted, and control in which the operation control unit changes a position of the robot based on the second movement command.

2. The controller according to claim 1, further comprising an auxiliary sensor configured to capture an image of the second member, wherein
the second member is a member that is to be gripped by an operation tool attached to the robot,
the controller is formed in such a manner that gripping control for controlling the robot and the operation tool and gripping the second member, and misalignment detection control for detecting an amount of positional misalignment of gripping of the second member with respect to the operation tool based on an image captured by the auxiliary sensor are performed before the approaching control, and
based on the amount of positional misalignment of the gripping detected in the misalignment detection control, misalignment correction control for correcting a position of the robot in such a manner that the amount of positional misalignment of the gripping is canceled out is performed before the position adjustment control.

3. The controller according to claim 1, wherein
the controller performs orientation detection control for detecting an amount of orientation deviation of the first member is performed based on an image captured by at least one vision sensor of the first vision sensor and the second vision sensor.

4. The controller according to claim 3, wherein
the controller is formed in such a manner that orientation correction control for correcting an orientation of the robot is performed such that an orientation of the second member with respect to the first member becomes a predetermined orientation, based on the amount of orientation deviation detected by the orientation detection control, and
the orientation correction control is performed during a period from after the approaching control is performed until before the position adjustment control is performed.

5. The controller according to claim 1, wherein
the robot apparatus includes a transporting machine configured to convey the first member, and
the controller repeatedly performs the approaching control or the position adjustment control during a period when the transporting machine conveys the first member.

6. The controller according to claim 5, wherein
the arithmetic processing unit calculates a movement direction and a movement amount of a position of the robot when the position of the robot follows a position of the first member being moved by the transporting machine based on a movement direction and a movement speed of the first member by the transporting machine, and changes the position and an orientation of the robot based on the movement direction and the movement amount of the robot when the position of the robot follows the position of the first member while performing the approaching control or the position adjustment control.

* * * * *